US012635715B2

(12) United States Patent
Bogaert et al.

(10) Patent No.: US 12,635,715 B2
(45) Date of Patent: May 26, 2026

(54) ISOFUCOSTEROL AND COMBINATIONS OF ISOFUCOSTEROL AND A MULTIPLICITY OF STEROLS AS A NUTRIENT FOR ANIMALS

(71) Applicants: APIX BIOSCIENCES, Wingene (BE); PHYTANT, Wingene (BE)

(72) Inventors: Thierry Bogaert, Wingene (BE); Sharoni Shafir, Wingene (BE); Geraldine Wright, Wingene (BE); Jan Bogaert, Wingene (BE)

(73) Assignees: APIX BIOSCIENCES, Wingene (BE); PHYTANT, Wingene (BE)

( * ) Notice: Subject to any disclaimer, the term of this patent is extended or adjusted under 35 U.S.C. 154(b) by 7 days.

(21) Appl. No.: 18/580,901

(22) PCT Filed: Sep. 10, 2023

(86) PCT No.: PCT/EP2023/074820
§ 371 (c)(1),
(2) Date: Jan. 19, 2024

(87) PCT Pub. No.: WO2024/056559
PCT Pub. Date: Mar. 21, 2024

(65) Prior Publication Data
US 2025/0089742 A1       Mar. 20, 2025

(30) Foreign Application Priority Data

Sep. 13, 2022    (BE) .................................. 2022/5727

(51) Int. Cl.
| | |
|---|---|
| *A23K 20/168* | (2016.01) |
| *A23K 20/147* | (2016.01) |
| *A23K 20/158* | (2016.01) |
| *A23K 20/163* | (2016.01) |
| *A23K 20/174* | (2016.01) |
| *A23K 50/90* | (2016.01) |

(52) U.S. Cl.
CPC .......... *A23K 20/168* (2016.05); *A23K 20/147* (2016.05); *A23K 20/158* (2016.05); *A23K 20/163* (2016.05); *A23K 20/174* (2016.05); *A23K 50/90* (2016.05)

(58) Field of Classification Search
CPC .. A23K 20/168; A23K 20/147; A23K 20/158; A23K 20/163; A23K 20/174; A23K 50/90; A23K 50/80
USPC ........................................................... 426/2
See application file for complete search history.

(56) References Cited

U.S. PATENT DOCUMENTS

| | | | | |
|---|---|---|---|---|
| 5,206,243 | A | * | 4/1993 | Hofmann ............. A61K 31/535 514/239.5 |
| 2019/0090507 | A1 | * | 3/2019 | Wright ................. A23K 20/168 |

FOREIGN PATENT DOCUMENTS

| | | |
|---|---|---|
| WO | WO 1994/17674 | 8/1994 |
| WO | WO 2007/074976 | 11/2006 |
| WO | WO 2007/056823 | 5/2007 |
| WO | WO 2017/017313 | 2/2017 |
| WO | WO 2017/085477 | 5/2017 |

OTHER PUBLICATIONS

NPL Doan et al. (in Processes 2019, 7(7), 456; https://doi.org/10.3390/pr7070456, pp. 1-11). (Year: 2019).*
Svoboda J.A. et al. "Sterol utilization in honey bees fed a synthetic diet: Analysis of prepupal sterols." Journal of Insect Physiology Jan. 1, 1980.
Herbert E.W. et al. "Sterol utilization in honey bees fed a synthetic diet: Effects on brood rearing." Journal of Insect Physiology Jan. 1, 1980.
Written Opinion for PCT/EP2023/074820.

* cited by examiner

*Primary Examiner* — Erik Kashnikow
*Assistant Examiner* — Bhaskar Mukhopadhyay
(74) *Attorney, Agent, or Firm* — Jerold I Schneider; SCHNEIDER IP LAW

(57) ABSTRACT

A method for feeding invertebrates or aquaculture organisms, comprising # providing a pollen substitute composition comprising a nutritionally effective amount of isofucosterol, fucosterol or a mixture thereof; and # administering the pollen substitute composition to invertebrates or aquaculture organisms; wherein the pollen substitute composition comprises a nutritionally effective amount at least one further sterol, preferably at least two further sterols selected from the group consisting of cholesterol, 24-Methylene-cholesterol, campesterol, stigmasterol and beta-sitosterol or a physiologically available conjugate of any of these sterols.

32 Claims, 17 Drawing Sheets

Diet A – Hive 29           Diet B – Hive 26

Diet A – Hive 29          Diet C – Hive 14

Fig. 19

ISOFUCOSTEROL AND COMBINATIONS OF ISOFUCOSTEROL AND A MULTIPLICITY OF STEROLS AS A NUTRIENT FOR ANIMALS

CROSS-REFERENCE TO RELATED APPLICATIONS

This application is the U.S. National Application based on PCT Application No. PCT/EP2023/07 filed on 13 Sep. 2023 which claims priority to Belgium Patent Application No. BE 2022/5727 filed on 13 Sep. 2022, the entireties of both of which are hereby incorporated herein.

BACKGROUND

Insects are increasingly used as economically important animals as pollinators and as animals capable of producing animal protein for human and animal feed cost effectively with less impact on the environment than traditional animal protein crops (birds, fish, mammals). Bees are very important in modern agriculture for the pollination of crops. Pollinators have recently been under threat due to exposure to pesticides, increased prevalence of pathogens and parasites, and changes to landscape management that reduce the abundance of naturally occurring floral pollen.

Beekeepers have historically fed honeybee colonies with a food source that contains pollen or pollen collected in natural or agricultural ecosystems by honeybees. Pollen collection is limited in availability and scale. Firstly, pollen collection is costly. Secondly, pollen is hard to keep fresh. Finally, pollen collected in natural or agricultural ecosystems can carry pests, diseases, and pesticides. Therefore, commercially available feeds for bees usually do not contain pollen.

However, lack of pollen in sufficient quality and quantity is a fundamental reason for observed declines in bee colony health and survival. Honeybees harvesting natural pollen resources impose pressure on resources for wild bee species and are likely to contribute to their population declines. Transport of beehives to pollen areas is a fundamental stressor to bee-colonies and a major cost to the beekeeping industry. A pollen replacement designed for domesticated bee species would address these issues.

Bees derive essential nutrients such as sterols from pollen. These sterols are likely to include cholesterol, campesterol, Beta-sitosterol or stigmasterol. Original work at the USDA Beltsville laboratory in the 1970's describes the utilization of sterols derived from pollen by honeybees that are fed a synthetic diet (Journal of Insect Physiology, Vol, 26, pp. 287-289). Chakrabarti et al. describe a role of 24-Methylenecholesterol in honeybee nutrition (Chakrabarti, Evaluating effects of a critical micronutrient (24-Methylenecholesterol) on honeybee physiology, Annals of the entomological society of America, Vol 113, 176-182, 2019). However, all these experiments have been performed with additions of single sterols to an otherwise sterol free diet. To date it has not been described which of the many sterols and which sterol combinations and concentrations are important or essential for bees.

US2019/0090507 to Apix Biosciences stresses the importance of plant sterols and, in particular, of 24-Methylenecholesterol, campesterol, β-sitosterol, and cholesterol. However, US2019/0090507 does not disclose isofucosterol nor fucosterol or a mixture thereof with sterols as important nutrients required to create a 'complete' feed for domesticated bees as a feed supplement.

Mishyna et al., Journal of Functional Foods 76 (2021) 104316, doi.org/10.1016/j.jff.2020.104316, discusses studies on the consumption of insects and shrimps in respect of hydrolysates, their antioxidant and angiotensin-converting enzyme inhibitory activities, fatty acids, cholesterol, minerals, vitamins, carotenoids, phenolic compounds, dietary fiber. However, this document does not mention isofucosterol nor the combination of cholesterol and isofucosterol.

Soy protein or other used protein sources such as potato contain campesterol, Beta-sitosterol, stigmasterol and trace amounts of desmosterol and isofucosterol (60 mg isofucosterol/kg wet weight of potato, or 0.006%). (Sirpa O. Karenlampi, Philip J. White, in Advances in Potato Chemistry and Technology, 2009) The concentration of sterols in these sources is below bee nutritional requirements.

In honeybees, isofucosterol makes up 10-50% of their total corporeal sterols. This amounts to 0.02-0.06% of the dry weight of a honeybee. (Svoboda et al. Utilization and metabolism of dietary sterols in the honeybee and the yellow fever mosquito, Lipids Volume 17 number 3, 1982; our data). In bumblebees such as *Bombus terrestris*, isofucosterol represents between 40-55% of their corporeal sterols. This quantity amounts to 0.10-0.25% of the total dry weight of a bumblebee.

Current artificial diets for bees are incomplete resulting in an initial boost of brood production followed by a rapid terminal decline in brood production over 22-40 days. This indicates that current diets lack one or more essential nutrients. However, to date there is no described artificial (pollen free) feed for bees that can support a colony's sealed brood development for more than 3 to 4 cycles of 21 days. The ability of a feed to support continuous long term brood development is a key indicator of its equivalence to pollen and its ability to act as "complete feed". The best published data already shows a strong reduction in brood production starting after cycle 2 (Herbert et al. (1980), J. Insect Physiol., Vol. 26, pp. 287 to 289; doi.org/10.1186/s12917-022-03151-5; Bee Culture Education: Honeybee Nutrition—Randy Oliver—Part 1 to 4, Youtube). Therefore, since there is a shortage in quality and quantity of pollen in many areas where bees are kept for pollination or honey production there is a need to provide compositions and methods for feeding bees in view of maintaining a colony long term on an artificial diet whereby bees continue to produce brood indefinitely.

Current pollen free artificial diets for bees are incomplete, so bees fed on these diets are deprived or depleted of essential nutrient reserves after 3-4 cycles of 21 days of brood production in the colony (Herbert et al. (1980), J. Insect Physiol., Vol. 26, pp. 287 to 289). Here we show that through addition of isofucosterol/fucosterol and a multiplicity of sterols we obtain a diet that maintains brood production and colony development in a colony for more than 4 cycles suggesting our diet overcomes the lack of one or more essential nutrients seen in current artificial diets. This shows that this invention results in a new diet supplying the bees with the necessary limiting ingredient/s they need. Therefore, such pollen free diet sustains a colony for extended periods of the colony's lifecycle without natural pollen, which is a significant development that can radically improve beekeeping practices.

Honeybees are critical for human food security. Despite having been domesticated for thousands of years to date, no pollen-free artificial diet was developed that fully obviates a hive's need to forage on nectar and pollen flowers for its nutrition. Such a diet will be a critical tool to sustain humanity's ability to sustainably pollinate 35% of the world's crops and protect the biodiversity of wild pollinators and plants.

Honeybee hives require a continuous and diverse source of nutritionally suitable pollen to fulfill their nutritional requirements. Pollen is a beehive's essential source of protein, carbohydrates, amino-acids, vitamins, lipids, sterols, and other micronutrients. Most plant species produce pollen whose composition fails to meet all nutritional requirements of a beehive. Therefore, honeybees developed physiological mechanisms to balance their nutritional needs by collecting pollen of different floral sources.

The nutritional relevance or requirement for honeybees of many of the complex molecules identified in pollen is still unknown. Pollen and honeybees contain beside macronutrients multiple members of specific chemical families (e.g. flavonoids, sterols, lipids . . . ).

In many papers the nutritional relevance of a specific molecule was inferred by correlating the composition of nutrients in different floral pollen sources with the nutritional properties of these different pollens. Since different floral pollens vary widely in composition in dozens of molecules this correlative approach does not really permit to draw conclusions on the relevance of single ingredients.

In another experimental approach to study honeybee nutrition, a single ingredient of such an ingredient family (a single sterol; a single antioxidant) is added to a simple basic diet (Herbert, Chakrabarti, See Table 7) and shown to have an effect usually in a short-term assay such as feeding and longevity of caged bees. This gives for each chemical an indication that the honeybees can nutritionally benefit from the presence of this member of the chemical family in the absence of other members of the chemical family but does not indicate whether this is the optimal molecule of the chemically required by the bees or whether the bees require or benefit from more than one family member to nutritionally support the beehive throughout the life cycle and seasons.

Insects cannot synthesize sterols and obtain sterols from their food source which most insects convert to cholesterol. Unlike most insects, bees (honeybees, bumblebees . . . ) contain only traces of cholesterol and are unable to dealkylate phytosterols to cholesterol. Honeybees, therefore, use phytosterols instead of cholesterol as structural elements in their membranes, as precursors for developmental hormones and as structural components of protein complexes (e.g., 24-methylene-cholesterol is a major component of Royal Jelly protein mrjp1-apimisin complexes; Table 7). Pollen from different flower species have widely different phytosterol compositions and ratios. Honeybees, bumblebees, and other bee species collect pollen from a diversity of species to balance their diet. The sterol composition of honeybees consists of 6 major sterols (listed below) that represent >90% of the sterols present in a honeybee. These phytosterols are present in variable ratios which partially reflect the phytosterol composition of the honeybee's floral diet. Typically, honeybee larvae contain 0.1-0.3% sterol in the following ratios: 40-60% 24-methylene-cholesterol; 15-40% Beta-sitosterol; 15-50% isofucosterol; 3-10% campesterol; 1-5% stigmasterol and 0.1-2% cholesterol dependent on the food source.

Only two experiments have been published with a holidic diet of defined sterol composition that address the importance of specific sterols in honeybee nutrition. In one experiment Herbert et al. (1980, Table 7) added the sterols, cholesterol, 24-methylene-cholesterol, beta-sitosterol, campesterol and stigmasterol (not isofucosterol) individually to a defined diet lacking sterols and fed these diets each containing one sterol to hives enclosed in a tent for up to 12 weeks. They showed that diets with some sterols such as 24-methylene-cholesterol resulted in more brood than diets with other sterols. No conclusion could be drawn from this experiment whether one sterol can be physiologically interchanged by another, i.e. whether honeybees require a multiplicity of sterols or only a few sterols and whether the absence of specific phytosterol can be compensated by the presence of (a combination of) other phytosterols.

Chakrabarti et al (Table 7) did a short-term feeding experiment with 24-methylene-cholesterol as single sterol present in an artificial diet showing that 24-methylene-cholesterol when present has significant physiological and metabolomic effects (brood production was not measured). These experiments however did not include a control diet with a different sterol than 24-methylene-cholesterol to assess whether the observed effects are specific to a specific sterol or non-specifically the sterol class of molecules. These experiments did not differentiate whether a sterol different from 24-methylene-cholesterol would have a similar effect or overlapping physiological effects.

To date it has not been shown which sterols in pollen are facultative sterols and which ones (if any) are nutritionally essential in the diet. To date no nutritional experiments assessing the nutritional requirement of isofucosterol for honeybees were reported. No experiments were reported that address whether omission from a complete diet, that contains a defined multiplicity of sterols in concentration and ratios similar to pollen, of 24-methylene-cholesterol or of isofucosterol or of both sterols impacts the fitness of a hive and its honeybees. For further references to the state of the art see Table 7.

SHORT DESCRIPTION OF THE INVENTION

Whereas only a few sterols exist in animals, with cholesterol being by far the major one, in plants a wide range of sterols are found. Structural variations between these arise from different substitutions in the side chain and the number and position of double bonds in the tetracyclic skeleton. Plant sterols can be grouped by the presence or absence of one or more functionalities. For example they can be divided into three groups based on ethylation levels at C4 as follows: 4-desmethylsterols or end product sterols, 4 alfa-monomethyl sterols and 4,4-di-ethylsterols. Naturally occurring 4-desm-ethylsterols include sitosterol, stigmasterol, brassicasterol, campesterol, avenasterol and isofucosterol. In most higherplants, sterols with a free 3-hydroxyl group (free sterols) are the major end products.

However, sterols also occur as conjugates, for example, where the 3-hydroxy group is esterified by a fatty acid chain or phenolic acid to give a steryl ester. For the purpose of this description, the term sterol refers both to free sterols and conjugated sterols. However in this specification references to levels, amounts or percentages of sterol refer to the total weight sterol groups whereby the weight of the conjugating groups such as fatty acid or phenolic acid is excluded. In this document fucosterol is defined as fucosterol or its isomer isofucosterol or a mixture of the two isomers. In this document isofucosterol is defined as isofucosterol or its isomer fucosterol or a mixture of the two isomers.

When described in this document a dose or amount fed is as x grams (or other quantity) in a two week period (or other time period), this is intended as general description of "dose given in a unit of time" and not a specific limitation the specific requirement to feed on a two weekly basis. A skilled person can recalculate a weekly dose regiment into daily or biweekly dose or any similar time period.

The present inventors have surprisingly established that isofucosterol is an essential nutrient for bees. Isofucosterol delivered through a pollen-free diet increases bee brood production and survival of worker bees as compared to an isofucosterol-free pollen substitute bee diet. The present inventors have further found that the combination of isofucosterol and at least one further sterol, in particular cholesterol, 24-Methylenecholesterol, and other phytosterols, in particular campesterol, beta-sitosterol or stigmasterol delivers higher growth and/or health performance in invertebrates, in particular bees and other pollen eating insects than isofucosterol alone.

This utility hereof is important in the formulation of non-pollen feed to supplement honeybee colonies in periods of pollen dearth in the environment (which is today a major source of poor performance of bee colonies), in the production of superior honeybee queens and in the commercial rearing of pollen eating insects such as black soldier flies as alternative protein source for human and animal feed, bumblebees (for pollination), ladybird beetles (for aphid control); hoverflies (for pollination) and other commercially relevant insects.

Accordingly, a first aspect of the invention is a method for feeding invertebrates or aquaculture organisms, comprising providing a pollen substitute composition comprising a nutritionally effective amount of isofucosterol, fucosterol or a mixture thereof; and administering the pollen substitute composition to invertebrates or aquaculture organisms;

wherein the pollen substitute composition comprises a nutritionally effective amount at least one further sterol, preferably at least two further sterols selected from the group consisting of cholesterol, 24-Methylenecholesterol, campesterol, stigmasterol and beta-sitosterol or a physiologically available conjugate thereof.

In another aspect, the invertebrates are pollen eating insects, preferably insects of the orders Hymenoptera and Coleoptera, more preferably honeybees, bumblebees, black soldier flies, hoverflies, or ladybirds.

In another aspect, the aquaculture organisms are plankton and algae eating aquaculture organisms, preferably fish, fish larvae, oysters, clams, molluscs, gastropods, or crustacea.

In another aspect, the nutritionally effective amount of isofucosterol, fucosterol or a mixture thereof is a daily dose of 0.0006 w % to 0.052 w % of the live bodyweight of the invertebrates or aquaculture organisms.

In another aspect, the nutritionally effective amount of isofucosterol, fucosterol or a mixture thereof is from 10 w % to 60 w % of the total amount of sterols of the group of isofucosterol, fucosterol, cholesterol, 24-Methylenecholesterol, campesterol, stigmasterol and beta-sitosterol in the total diet of the invertebrates or aquaculture organisms or the pollen substitute composition.

In another aspect, the isofucosterol, fucosterol or a mixture thereof is administered in a ratio of 0.14 g to 12 g of isofucosterol, fucosterol or a mixture thereof per 30000 bees per period of two weeks.

In another aspect, the isofucosterol, fucosterol or a mixture thereof is administered in an amount from 10 w % to 60 w % of the total amount of sterols of the group of isofucosterol, fucosterol, cholesterol, 24-Methylenecholesterol, campesterol, stigmasterol and beta-sitosterol in the total diet of the invertebrates or aquaculture organisms or of the pollen substitute composition.

In another aspect, the nutritionally effective amount of the isofucosterol, fucosterol or a mixture thereof and the at least one further sterol is an administration ratio of 0.2 to 48 grams per 30000 bees per a time period of two weeks, and the isofucosterol, fucosterol or a mixture thereof is administered in an amount from 10 w % to 60 w % of the total amount of sterols of the group of isofucosterol, fucosterol, cholesterol, 24-Methylenecholesterol, campesterol, stigmasterol and beta-sitosterol in the total diet of bees or of the pollen substitute composition.

In another aspect, the isofucosterol, fucosterol or a mixture thereof and the at least one further sterol is administered in a ratio of 0.4 g to 36 g per 30000 bees per a time period of two weeks, and the isofucosterol, fucosterol or a mixture thereof is administered in an amount from 10 w % to 60 w % of the total amount of sterols of the group of isofucosterol, fucosterol, cholesterol, 24-Methylenecholesterol, campesterol, stigmasterol and beta-sitosterol in the total diet of bees or of the pollen substitute composition.

In another aspect, the isofucosterol, fucosterol or a mixture thereof and the at least one further sterol is administered in a ratio of 0.6 g to 20 g per 30000 bees per a time period of two weeks, and the isofucosterol, fucosterol or a mixture thereof is administered in an amount from 10 w % to 60 w % of the total amount of sterols of the group of isofucosterol, fucosterol, cholesterol, 24-Methylenecholesterol, campesterol, stigmasterol and beta-sitosterol in the total diet of bees or of the pollen substitute composition.

In another aspect, the isofucosterol, fucosterol cholesterol, 24-Methylenecholesterol, beta-stigmasterol, stigmasterol and/or campesterol are administered in a total amount of 0.001 w % to 0.087 w % of the life weight of the invertebrates or aquaculture organisms per day.

In another aspect, the nutritionally effective amount is:

isofucosterol in an amount of 10 w % to 60 w %, cholesterol in an amount of 0 w % to 50 w %, 24-Methylenecholesterol in an amount of 0 w % to 50 w %, beta-sitosterol, stigmasterol and/or campesterol in an amount of 0 w % to 50 w % as compared to the total amount of isofucosterol, fucosterol cholesterol, 24-Methylenecholesterol, beta-sitosterol, stigmasterol and/or campesterol.

In another aspect, the total concentration of sterols is from 0.01 w % to 4 w %, preferably from 0.05 w % to 3 w % and even more preferably from 0.05 w % to 2 w %, and even more preferably from 0.05 w % to 1.5 w % as compared to the total weight of the pollen substitute composition.

In another aspect, the concentrations of sterols are chosen from the group of:

Cholesterol in an amount from 0.001 w % to 2 w %, preferably from 0.001 w % to 1.5 w %, more preferably from 0.06 w % to 1.2 w % as compared to the total weight of the pollen substitute composition, 24-Methylenecholesterol in an amount from 0.001 w % to 2 w %, preferably 0.001 w % to 1.5 w %, more preferably from 0.06 w % to 1.2 w % as compared to the total weight of the pollen substitute composition, Sitosterol, preferably beta-sitosterol in an amount from 0.001 w % to 2 w %, preferably from 0.001 w % to 1 w %, more preferably from 0.03 w % to 0.6 w % as compared to the total weight of the pollen substitute composition, Isofucosterol in an amount from 0.01 w % to 5 w %, preferably from 0.01 w % to 2 w %, more preferably from 0.01 w % to 1.0 w %, more preferably from 0.03 w % to 0.6 w % as compared to the total weight of the pollen substitute composition, Campesterol in an amount from 0.001 w % to 2 w %, preferably from 0.001 w % to 1 w %, more preferably from 0.02 w % to 0.35 w %, as compared to the total weight of the pollen substitute composition, Stigmasterol in an amount from 0.001 w % to 2 w %, preferably 0.001 to 1 w %, more preferably 0.01-0.2%, as compared to the total weight of the pollen substitute composition, or any combination thereof.

In another aspect, the composition is a whole invertebrate diet, part of an invertebrate diet or a dietary supplement and wherein the ratio of 24-Methylenecholesterol to the further sterol or to the combination of further sterols is from 10:1 to 1:1.

In another aspect, the composition is administered to invertebrates of the Apidae families, in particular honeybees (Apini), bumblebees (Bombini), or stingless honeybees (Meliponini).

In another aspect, the composition is administered
in solid form such as a patty or powder or in liquid form such as a solution, oil or spray,
inside or outside the hive.

In one embodiment, the composition is substantially pure, i.e. consists of 50 w % or more, preferably 70 w % or more, even more preferably 90 w % of the of the group of isofucosterol, fucosterol, cholesterol, 24-Methylenecholesterol, campesterol, stigmasterol and beta-sitosterol in the total diet of bees or of the pollen substitute composition.

In one embodiment, the composition is substantially pure, i.e. free of any further compounds.

In another aspect, the source of the isofucosterol, fucosterol or a mixture thereof is a non-pollen tissue of one or more plant species selected from the group consisting of leaves, stems, roots, tubers, flowers, seeds, barks and fruits and combinations thereof.

In another aspect, the source of the further sterol selected from the group consisting of cholesterol, 24-Methylenecholesterol, campesterol, and beta-sitosterol, and stigmasterol is a pollen substitute tissue of one or more plant species selected from the group consisting of leaves, stems, roots, tubers, flowers, seeds, barks and fruits and combinations thereof.

In another aspect, the source of the isofucosterol, fucosterol or a mixture thereof or the source of the at least one further sterol selected from the group consisting of cholesterol, 24-Methylenecholesterol, campesterol, and beta-sitosterol, and stigmasterol is an extract, an oil, or a refinement of a pollen substitute tissue of one or more a plant species or a combination thereof.

In another aspect, the source of the isofucosterol, fucosterol or a mixture thereof or the source of the at least one further sterol selected from the group consisting of cholesterol, 24-Methylenecholesterol, campesterol, and beta-sitosterol and stigmasterol is a pollen substitute tissue of one or more plant species selected from the group consisting of Solanaceae, Poaceae, Ranunculaceae, Fabaceae, Corylaceae.

In another aspect, the source of the isofucosterol, fucosterol or a mixture thereof or the source of the at least one further sterol selected from the group consisting of cholesterol, 24-Methylenecholesterol, campesterol, and beta-sitosterol and stigmasterol is a pollen substitute source selected from the group consisting of:
a marine or freshwater algal species, in particular an extract, an oil or a refinement of *Ulva lactuca;* a marine diatom species, in particular an extract, an oil or a refinement of *Thalassiosira pseudonana, Thalassiosira rotula,* or *Chaetoceros muelleri; and*
a fungus, in particular an extract, an oil or a refinement of a yeast such as *Saccharomyces cerevisiae,* or *Yarrowia lipolytica.*

In another aspect, the isofucosterol, fucosterol or a mixture thereof and/or the at least one further sterol selected from the group consisting of cholesterol, 24-Methylenecholesterol, campesterol, and beta-sitosterol, and stigmasterol is chemically or enzymatically synthesized or obtained by genetically modified host organisms such as fungi, bacteria, or algae.

In another aspect, the source of the isofucosterol, fucosterol or a mixture thereof or the at least one further sterol selected from the group consisting of cholesterol, 24-Methylenecholesterol, campesterol, and beta-sitosterol, and stigmasterol is selected from the group consisting of algae, plant, fungus, algae, diatom and combinations thereof and wherein source of the isofucosterol, fucosterol or a mixture thereof is a pollen substitute tissue.

In another aspect, the isofucosterol, fucosterol or a mixture thereof and the at least one further sterol selected from the group consisting of cholesterol, 24-Methylenecholesterol, campesterol, and beta-sitosterol, and stigmasterol is provided to a eusocial bee colony from a synthetic source.

In another aspect, the isofucosterol, fucosterol or a mixture thereof and the one or more further sterols from the group consisting of cholesterol, 24-Methylenecholesterol, campesterol, stigmasterol and beta-sitosterol, and stigmasterol are provided as part of a pollen substitute composition, wherein the pollen substitute composition comprises:
proteins in an amount from 10 w % to 50 w %, preferably of 15 w % to 40 w %,
fatty acids in an amount from 1 w % to 20 w %, preferably of 2 w % to 12 w %,
carbohydrates in an amount from 20 w % to 90 w %, preferably of 30 w % to 70 w %,
optionally vitamins, and
optionally minerals,
wherein the total amount of components adds up to 100 w % and wherein the w % are related to the total dry weight of the composition.

In another aspect, the pollen substitute composition is free of pollen.

In another aspect, the pollen substitute composition is used for feeding an organism selected from the group consisting of:
invertebrates, preferably pollen eating insects, more preferably insects of the orders Hymenoptera and Coleoptera, even more preferably honeybees, bumblebees, black soldier flies, hoverflies, or ladybirds,
aquaculture organisms, preferably plankton and algae eating aquaculture organisms, more preferably fish, fish larvae, oysters, clams, molluscs, gastropods, or crustacea.

Another aspect is the use of the pollen substitute composition of the invention as a concentrated patty, wherein the concentration of isofucosterol, fucosterol, cholesterol, 24-Methylenecholesterol, campesterol, stigmasterol and beta-sitosterol is from 10 w % to 33 w % as compared to the total weight of the pollen substitute composition.

In another aspect, the pollen substitute composition comprises the bee appetite/consumption inducing constituent selected from the group consisting of pollen, sugar, oil or fat, honey, or protein or a mixture thereof. In case of other invertebrates, a different appetite/consumption inducing constituent can be used.

In another aspect, the concentration of the bee appetite/consumption inducing constituent is from 1 w % to 20 w %, preferably from 2.5 w % to 15 w %, even more preferably from 5 w % to 10 w % as compared to the total weight of the pollen substitute composition.

In another aspect, the pollen substitute composition is used in liquid form or powder.

In another aspect of the use as liquid form or powder, the concentration of isofucosterol, fucosterol, cholesterol, 24-Methylenecholesterol, campesterol, stigmasterol and beta-sitosterol is from 0.01 w % to 99 w % as compared to the total dry weight of the pollen substitute composition.

Another aspect of the present invention is a pollen-free feed composition or a pollen-substitute composition in particular for bees comprising 0.01 w % to 1 w % isofucosterol, preferably 0.01 w % to 0.3 w % isofucosterol, as compared to the total weight of the pollen-substitute composition, wherein the composition optionally further comprises natural pollen in an amount from 1 w % to 15 w % as compared to the total weight of the pollen-substitute composition to increase food consumption.

Another aspect of the present invention is a pollen-free feed composition or a pollen-substitute composition in particular for bees comprising 0.01 w % to 1 w % fucosterol, preferably 0.01 w % to 0.3 w % as compared to the total weight of the pollen-substitute composition, wherein the composition optionally further comprises natural pollen in an amount from 1 w % to 15 w % as compared to the total weight of the pollen-substitute composition to increase food consumption.

Another aspect of the present invention is a pollen-free feed composition or a pollen-substitute composition in particular for bees comprising 0.01 w % to 1 w % isofucosterol and fucosterol, preferably 0.01 w % to 0.3 w % as compared to the total weight of the pollen-substitute composition, wherein the weight-ratio of isofucosterol to fucosterol is from 0.01:to 100 to 100:0.01 and wherein the composition optionally further comprises natural pollen in an amount from 1 w % to 15 w % as compared to the total weight of the pollen-substitute composition to increase food consumption.

Another aspect of the present invention is a pollen-free feed composition or a pollen-substitute composition in particular for bees comprising 0.01 w % to 1 w % isofucosterol/fucosterol, preferably 0.01 w % to 0.3 w % as compared to the total weight of the pollen-substitute composition;

Wherein the weight-ratio of isofucosterol to fucosterol is from 0.01:100 to 100:0.01;

Wherein the pollen substitute composition further comprises 0.01 w % to 0.5 w % 24-methylene-cholesterol as compared to the total weight of the pollen-substitute composition;

Wherein the ratio of isofucosterol and fucosterol to 24-methylene-cholesterol is from 2:100 to 100:2; and Wherein the pollen substitute composition optionally further comprises natural pollen in an amount from 1 w % to 15 w % as compared to the total weight of the pollen-substitute composition to increase food consumption.

Another aspect of the present invention is a pollen-free feed composition or a pollen-substitute composition in particular for bees comprising 0.01 w % to 1 w % 24-methylene-cholesterol, preferably 0.01 w % to 0.3 w % as compared to the total weight of the pollen-substitute composition;

Wherein the pollen-substitute composition further comprises isofucosterol and fucosterol with a weight-ratio of isofucosterol to fucosterol from 0.01:100 to 100:0.01;

Wherein the weight-ratio of isofucosterol and fucosterol to 24-methylene-cholesterol is from 2:100 to 100:2; and Wherein the pollen substitute composition optionally further comprises natural pollen in an amount from 1 w % to 15 w % as compared to the total weight of the pollen-substitute composition to increase food consumption.

Another aspect of the present invention is a pollen-free feed composition or a pollen-substitute composition in particular for bees comprising 0.02 w % to 3 w % sterols, wherein the sterols are selected from a group consisting of 24-methylene-cholesterol, isofucosterol, fucosterol beta-sitosterol, campesterol, stigmasterol, ergosterol and cholesterol as compared to the total weight of the pollen-substitute composition;

Wherein the weight-ratio of isofucosterol and fucosterol to 24-methylene-cholesterol is from 0.5:100 to 100:0.5; and/or Wherein the weight-ratio of isofucosterol to fucosterol is from 0:10 to 10:0; and/or of isofucosterol to the sum of one or more other sterols selected from the group 24-methylene-cholesterol, fucosterol, beta-sitosterol, campesterol, stigmasterol, cholesterol, ergosterol of 2:100 to 100:2; and/or Wherein the weight-ratio of fucosterol to the sum of other sterols selected from the group 24-methylene-cholesterol, isofucosterol, beta-sitosterol, campesterol, stigmasterol, cholesterol, ergosterol of 2:100 to 100:2; and/or Wherein the weight-ratio of 24-methylene-cholesterol to the sum of one or more other sterols selected from the group isofucosterol, fucosterol, beta-sitosterol, campesterol, stigmasterol, cholesterol, ergosterol of 2:100 to 100:2; and/or Wherein the weight-ratio of cholesterol to the sum of one or more sterols selected from the group 24-methylene-cholesterol, isofucosterol, fucosterol, beta-sitosterol, campesterol, stigmasterol, ergosterol of 15:1 to 1:100; and/or Wherein the pollen substitute composition optionally further comprises natural pollen in an amount from 1 w % to 15 w % as compared to the total weight of the pollen-substitute composition to increase food consumption.

SHORT DESCRIPTION OF THE DRAWINGS

Figure 7:
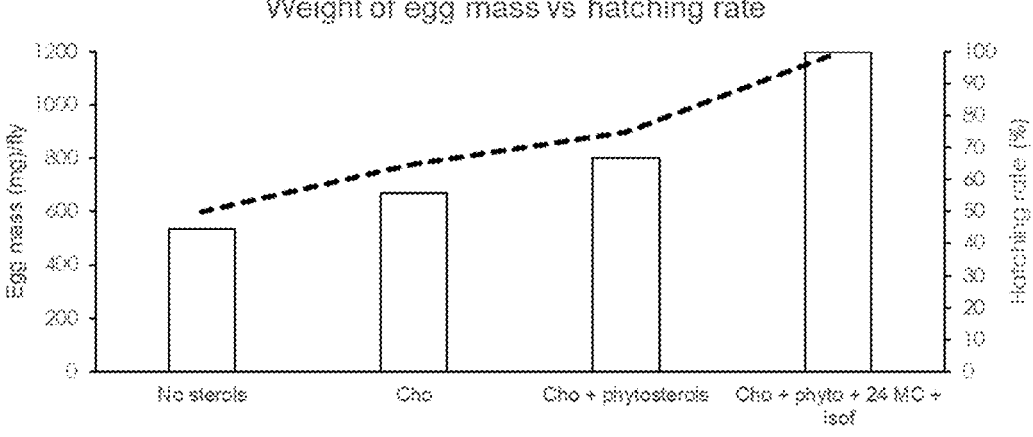

FIG. 7 shows the results of Example 5A: Feeding adult Black soldier flies with a diet containing a multiplicity of sterols: effect on hatching rate of the eggs laid and the weight of the egg mass laid. Adult survival and number of egg masses laid from a population fed with a pollen substitute diet (as specified in US2019/0090507 to Apix Biosciences) was measured daily using the methods of rearing described in Thinn and Kainoh 2022. JARQ 56 (2), 211-217 (2022).

Figure 8:
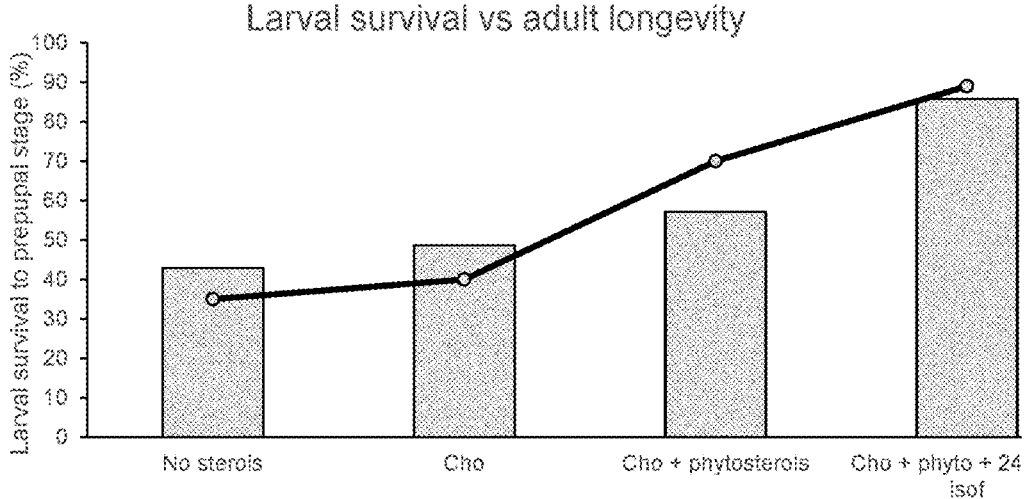

FIG. 8 shows the results of Example 5B: Feeding adult Black soldier flies with a diet containing a multiplicity of sterols: effect on adult longevity and larval survival to prepupae stage. Black soldier fly (BSF) larvae were fed with a diet containing 22% protein, 4% fat as described in Hogsette 1992. J. Econ. Entomol. 85(6): 2291-2294 until ecclosion. Sterols were sourced as pure compounds added directly to diet to a total quantity of 0.1%. Larvae and adult survival over a 50-day period measured as in Georgescu et al., Eur. J. Entomol. 118: 297-306,2021.

Figure 9:
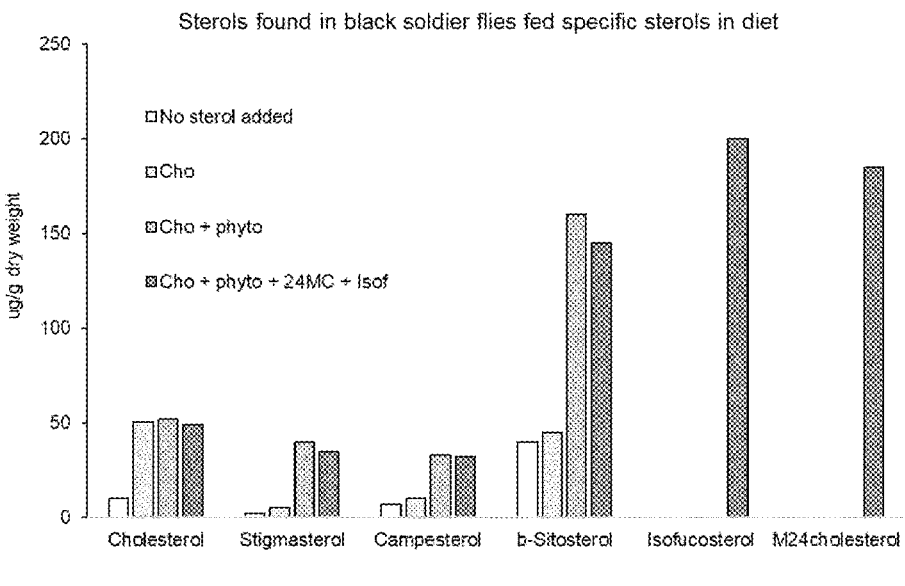

FIG. 9 shows the results of Example 5C: Feeding adult Black soldier flies with different diets containing a multiplicity of sterols: sterols found in in the tissues of black soldier flies fed with a multiplicity of sterols. Sterols were added to diet. Measurement of sterols in tissues was performed after saponification of BSF tissues using GC-MS as described in Boukid et al. 2022. Insects 12, 672.

Figure 10:
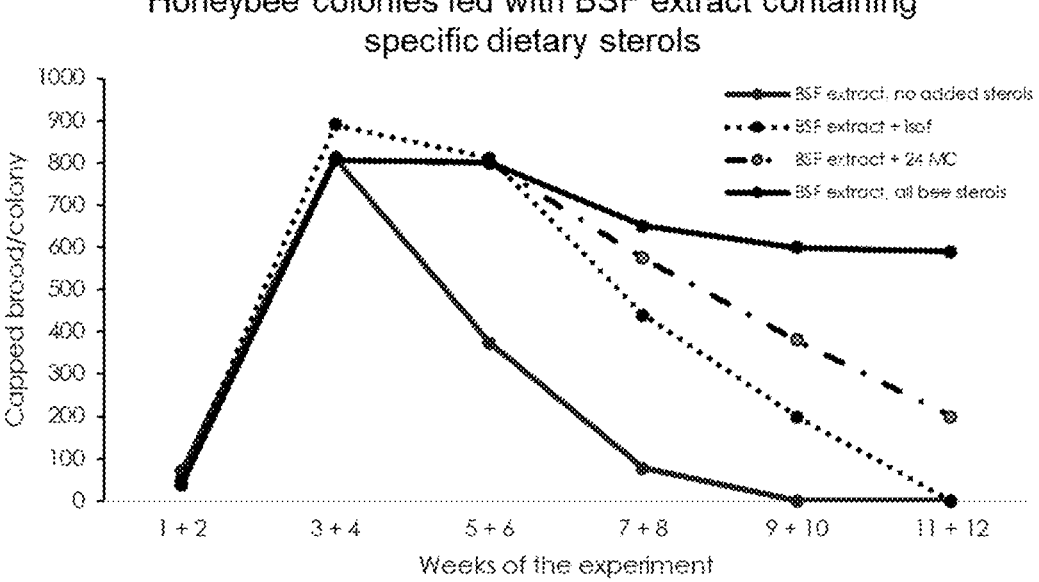

FIG. 10 shows the results of Example 6: Feeding honeybee colonies in an Apidea experiment with a diet containing an extract of Black soldier flies that were fed a multiplicity of sterols.

Figure 11:
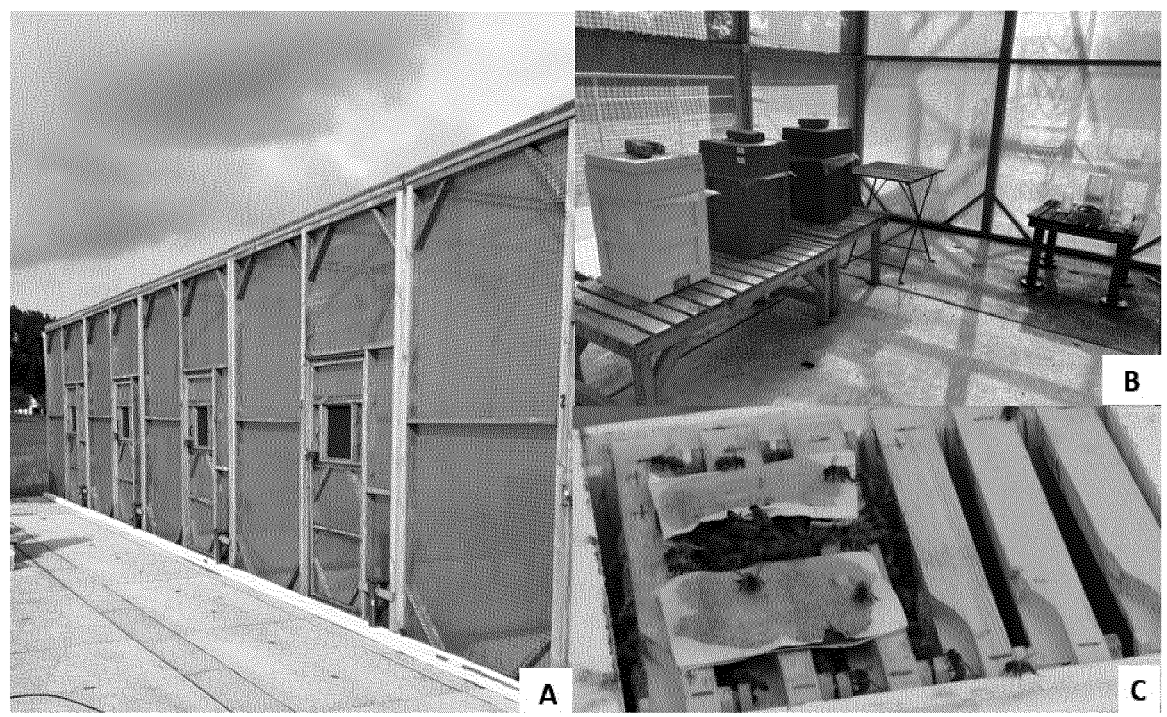
Figure 11:
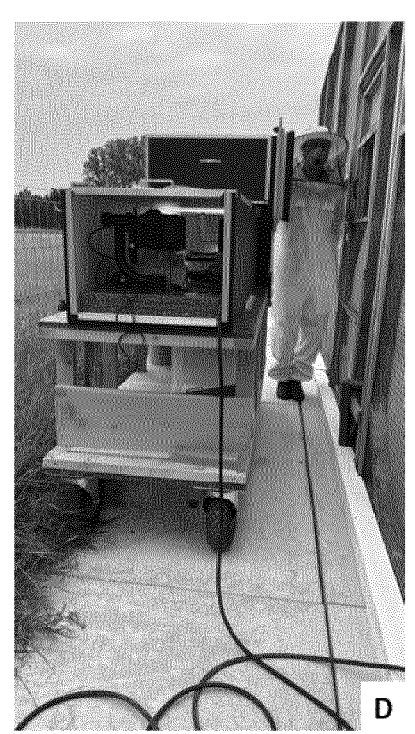

FIG. 11 shows the experimental setup of Example 7. FIG. 11A is a photograph of the tented enclosures. FIG. 11B is a photograph of the hives and feeders in the tents shown in FIG. 11A. FIG. 11C shows a patty on top of the bee frame in a miniplus hive. FIG. 11D shows the setup and device to photograph the individual frames.

Figure 12:
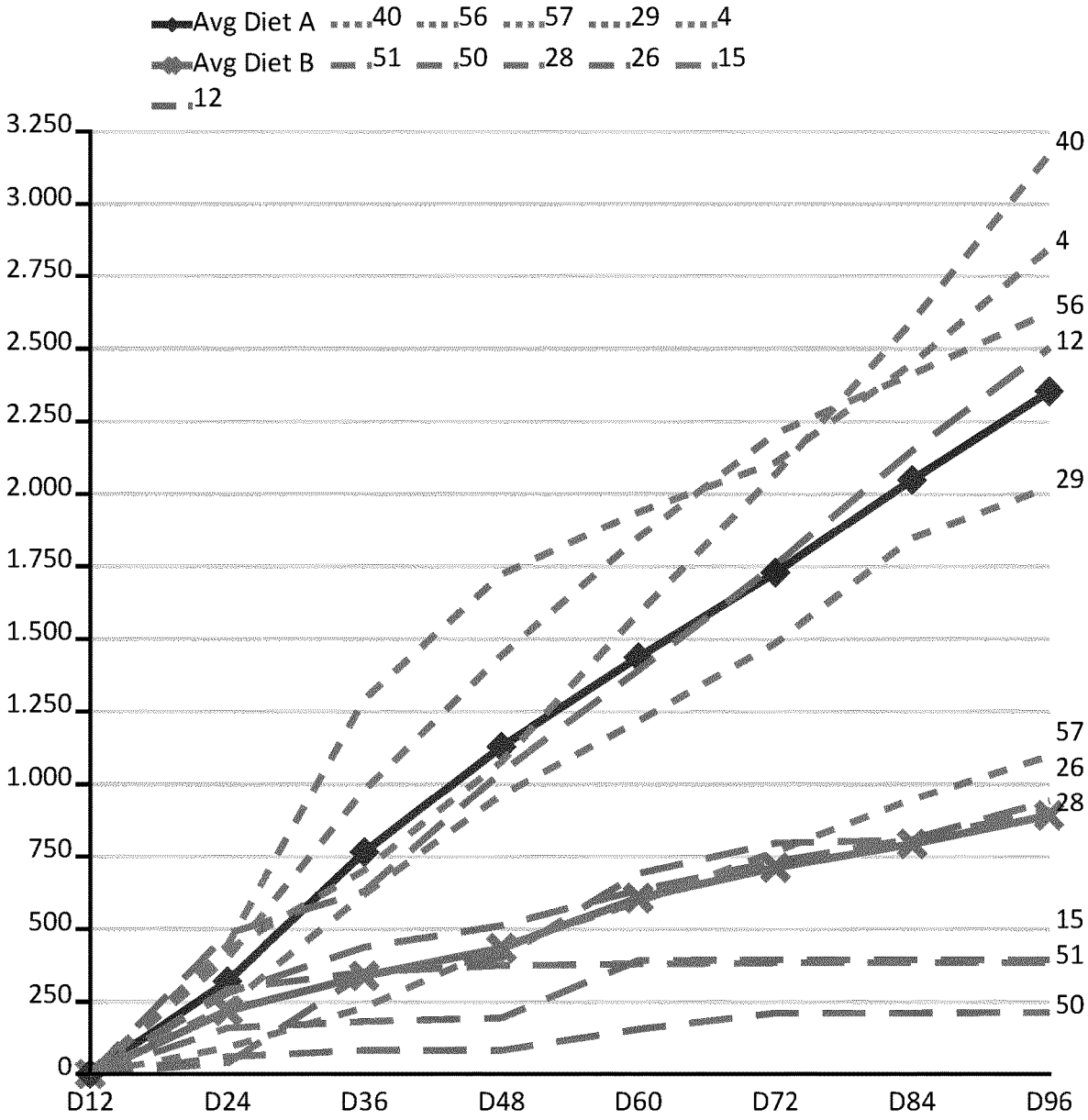

FIG. 12 shows the cumulative capped brood count of hives in tented enclosures shown in FIG. 11 and fed with Diet A vs Diet B according to example 7 (Raw data from Tables-2B and 4). The vertical axis shows the cumulative number of capped brood produced from day 12 to day 96. The horizontal axis shows day 12 to Day 96 after the start of placement of the hives in the tented enclosures and the start of feeding of Diet A or Diet B. The Upper solid line shows the average of all hives fed with Diet A. The lower solid line shows the average of all hives fed with Diet B. The individual hive fed with Diet A is represented by the short-dashed line followed by the hive number. The individual hive fed with Diet B is represented by the long-dashed line followed by the hive number.

Figure 13:
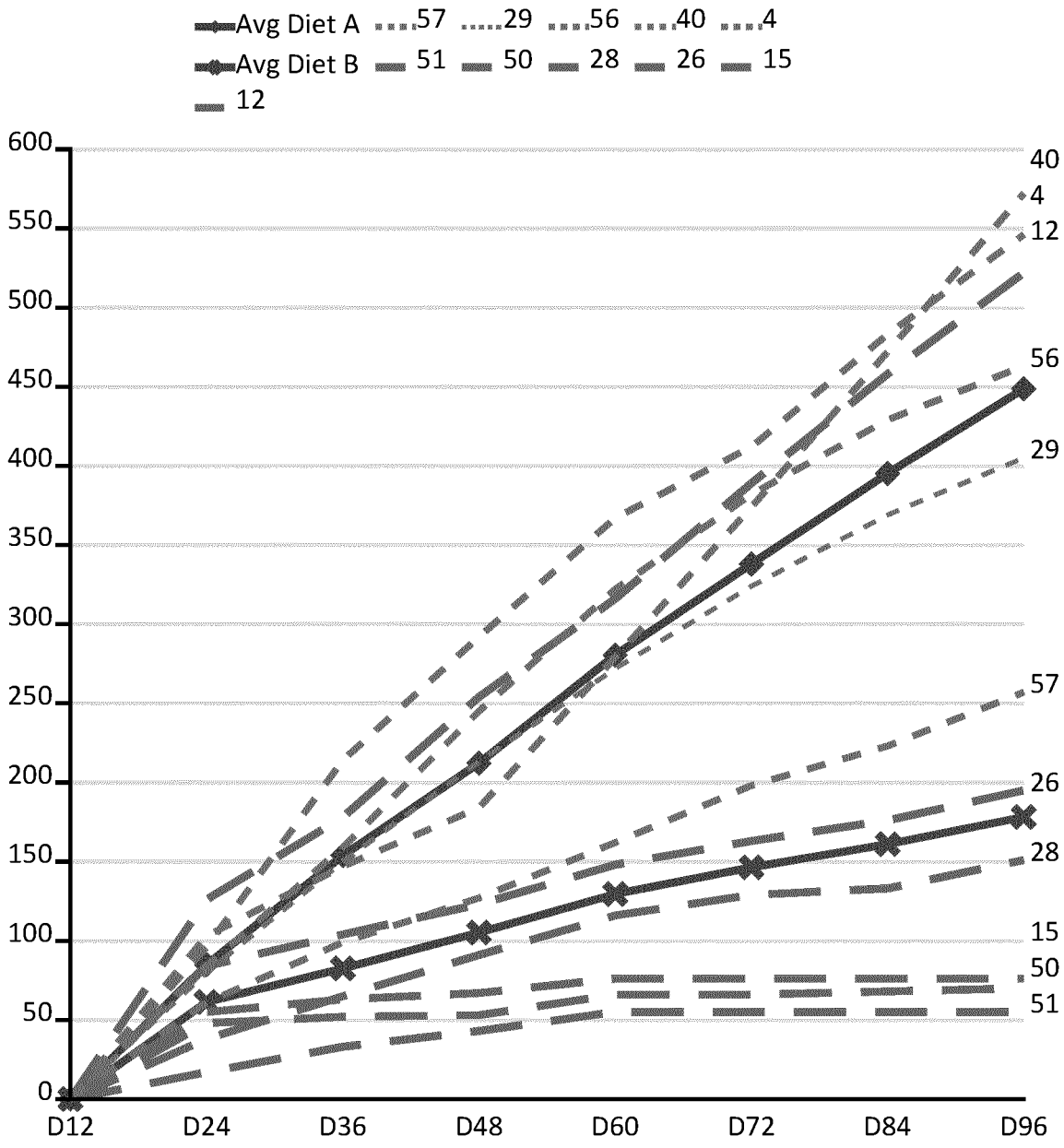

FIG. 13 shows the cumulative weight of diet consumed of hives in tented enclosures fed Diet A vs Diet B according to example 7. The vertical axis shows the cumulative gram feed consumed from day 12 to day 96. The horizontal axis shows day 12 to day 96 post start of placement of the hives in tented enclosures and the start of feeding Diet A or Diet B. The upper solid line shows the average of all hives fed with Diet A. The lower solid line shows the average of all hives fed with Diet B. The individual hive fed with Diet A is represented by the short-dashed line followed by the hive number. The individual hive fed with Diet B is represented by the long-dashed line followed by the hive number.

Figure 14:
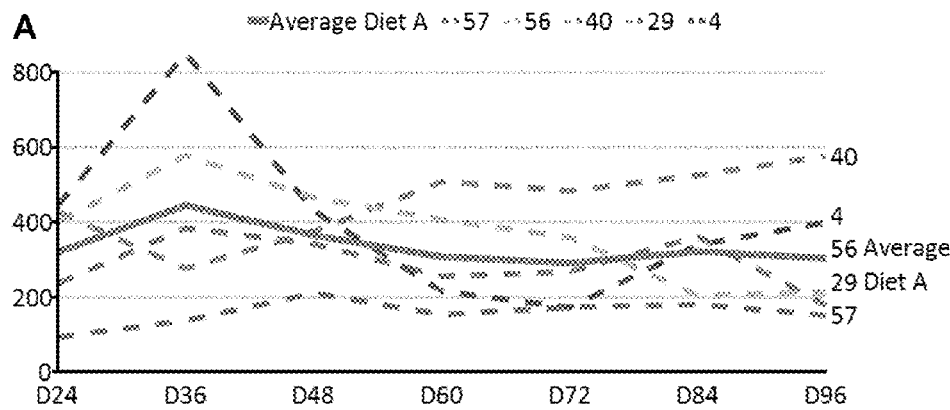
Figure 14:
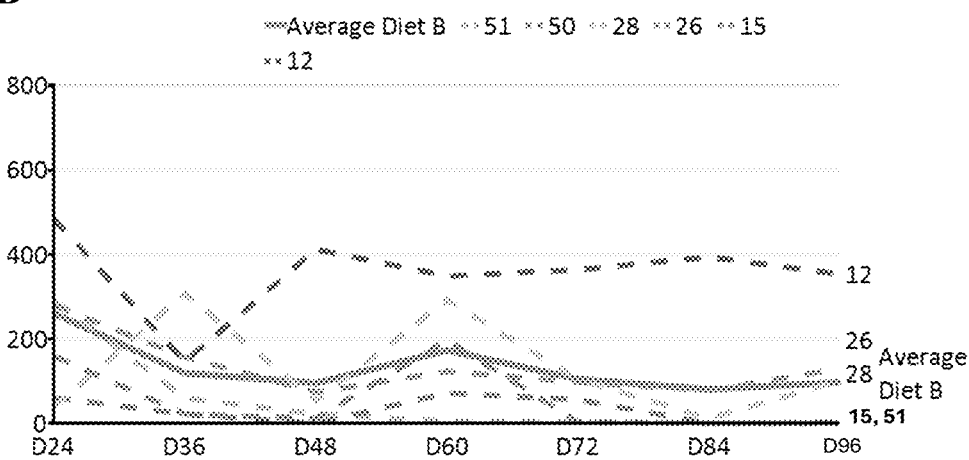
Figure 14:
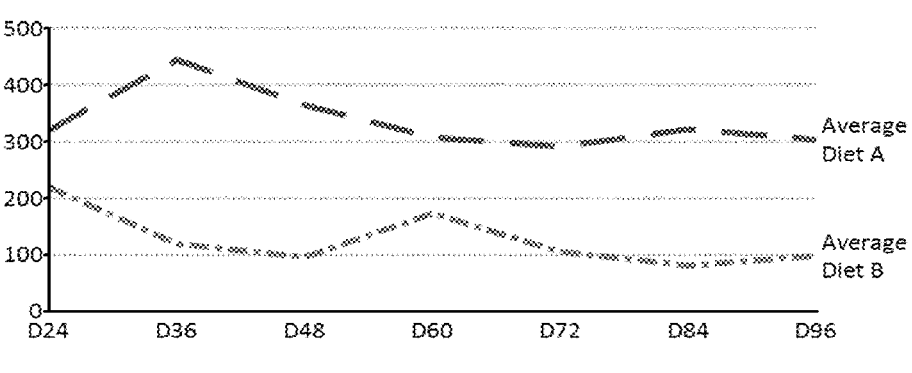

FIG. 14 shows the capped brood count in hives fed with Diet A or Diet B from time point day 24 to 96 after the start of placement in enclosed tent and the start of feeding the diets according to example 7 (Raw data in tables-2A and 3). The vertical axis shows the number of capped brood produced from day 24 to day 96. The horizontal axis shows day 24 to day 96 post start of placement of the hives in tented enclosures and the start of feeding Diet A or Diet B.

Figure 15:
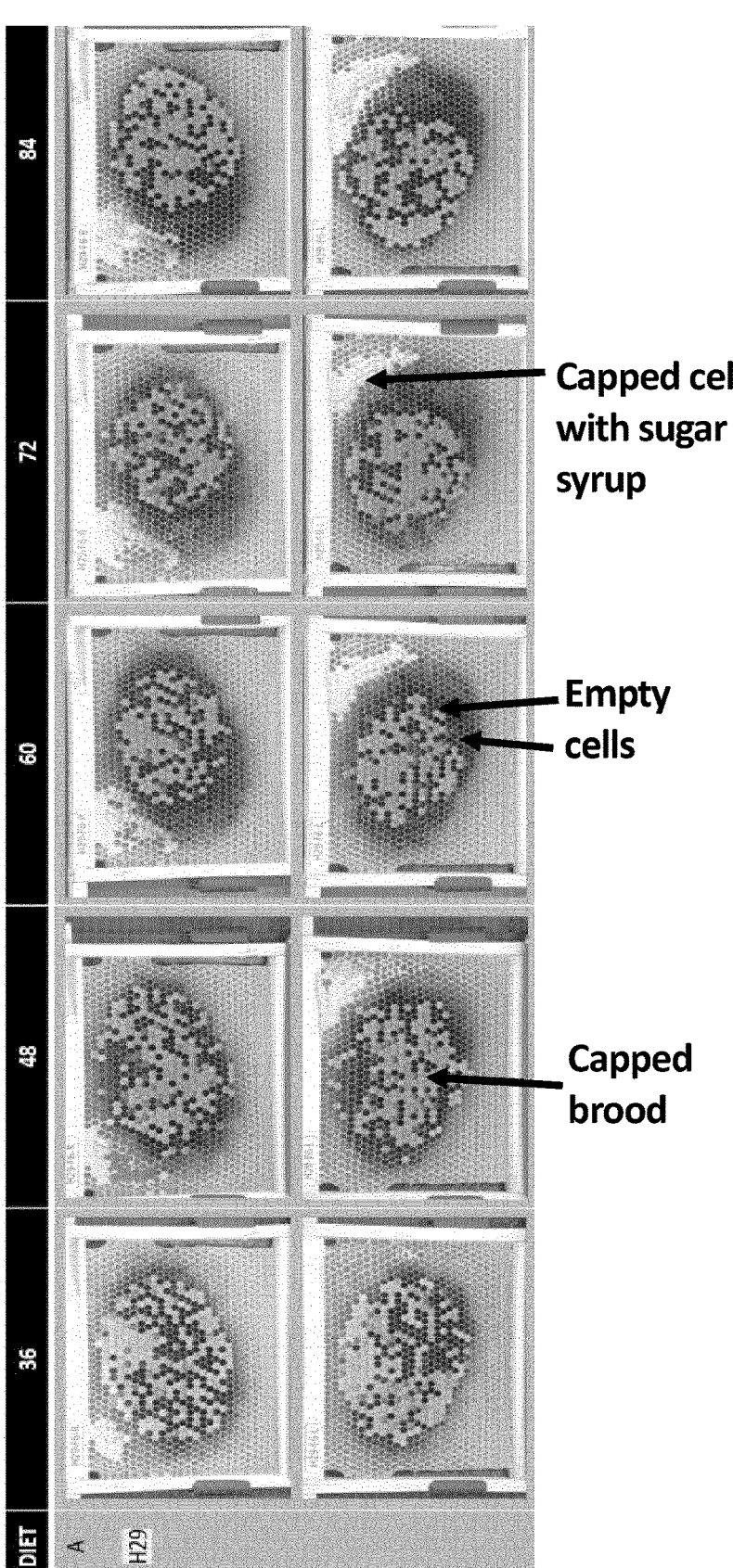

FIG. 15 shows photographs of all frames with brood in hive 29, fed with diet A from day 36 to 84 according to Example 7.

Figure 16:
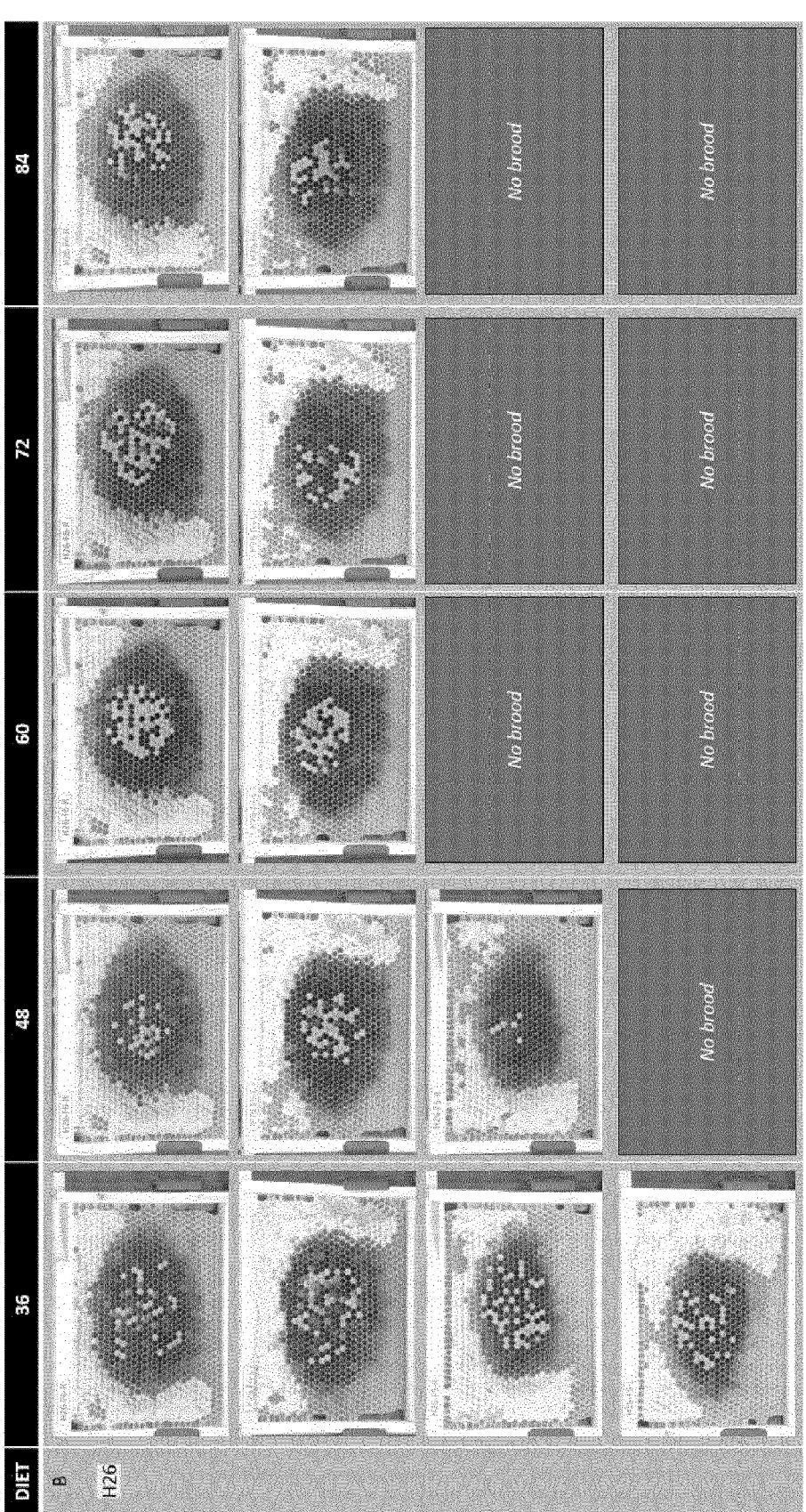

FIG. 16 shows photographs of all frames with brood in hive 29, fed with diet B from day 36 to 84 according to Example 7.

Figure 17:
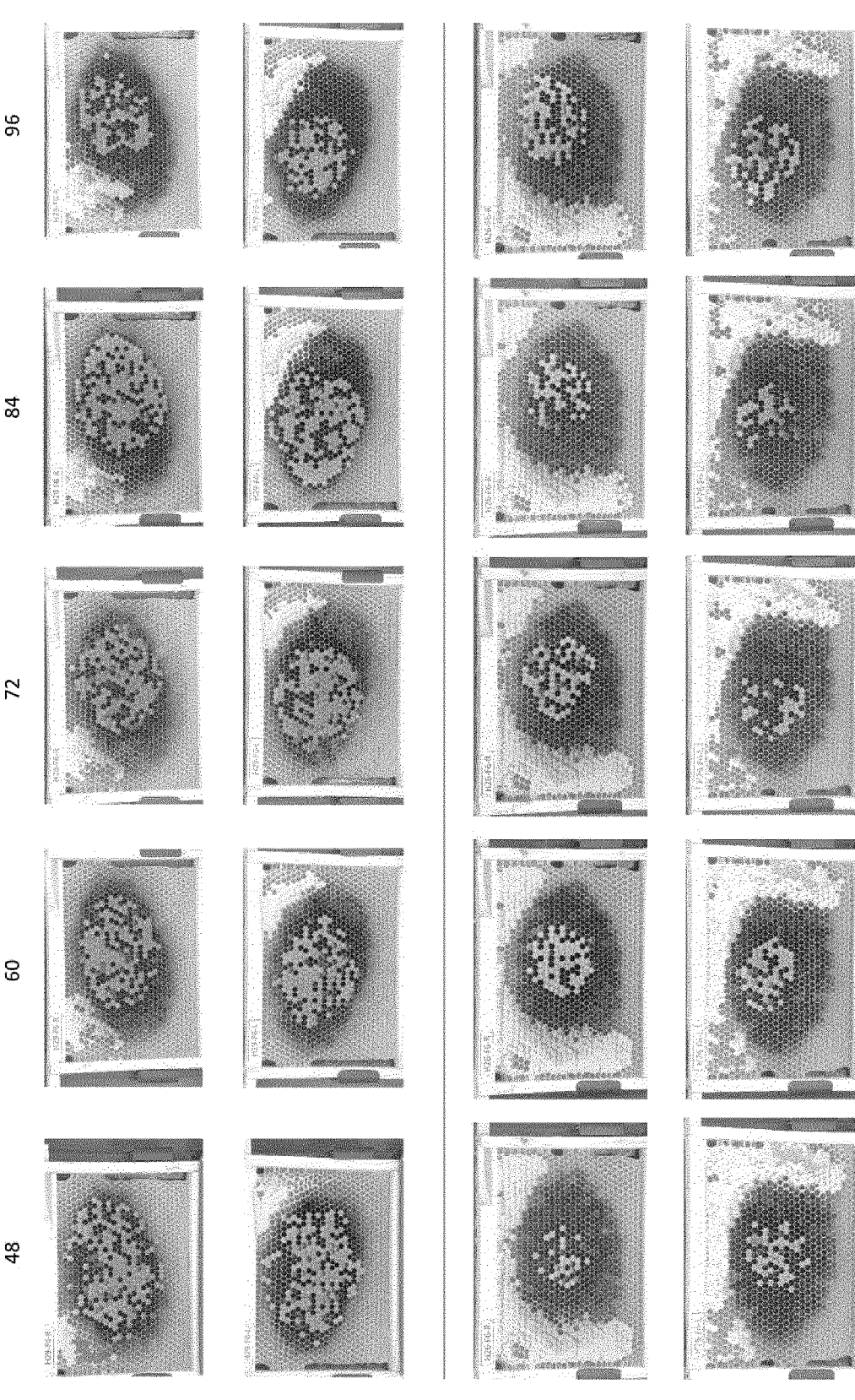

FIG. 17 shows photographs of the frames with brood in hive 29 (upper 2 rows) fed with Diet A and hive 26 (lower 2 rows) fed with Diet B on day 60, 72 and 84 after the start of the experiments according to Example 7. Both hive 29 and 26 plot close the averages for hives fed Diet A and Diet B.

Figure 18:
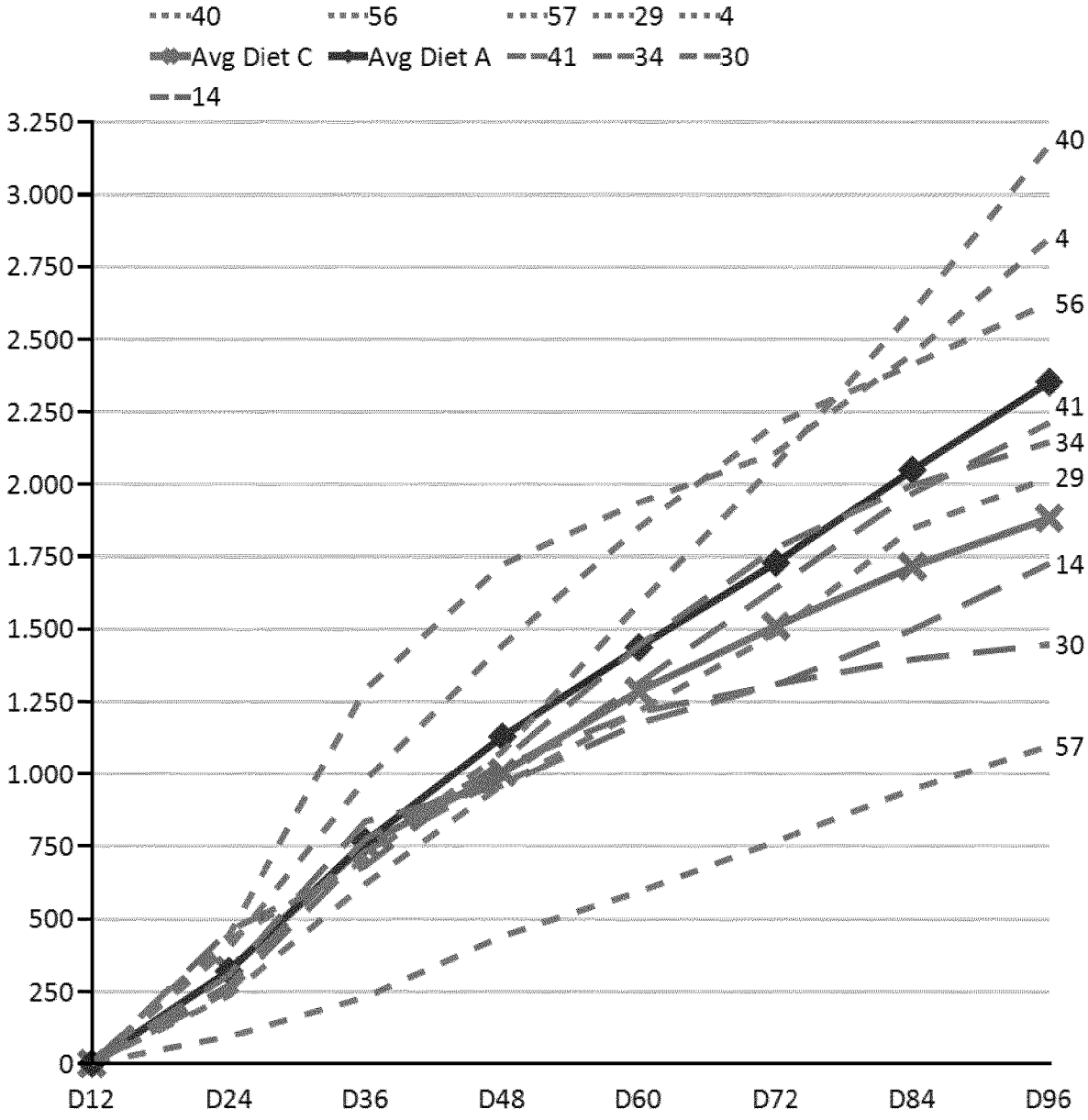

FIG. 18 shows the cumulative capped brood count of hives in tented enclosures fed Diet A vs Diet C according to Example 7 (Raw data from Tables-2B and 4). The vertical axis shows the cumulative number of capped brood produced from day 12 to day 96. The horizontal axis shows the day 12 to day 96 after the start of placement of the hives in tented enclosures and the start of feeding Diet A or Diet B. The upper solid line shows the average of all hives fed with DIET A. The lower solid line is the average of all hives fed with Diet C. The individual hive fed with Diet A is represented by the short-dashed line followed by the hive number. The individual hive fed with Diet C is represented by the long-dashed line followed by the hive number.

Figure 19:
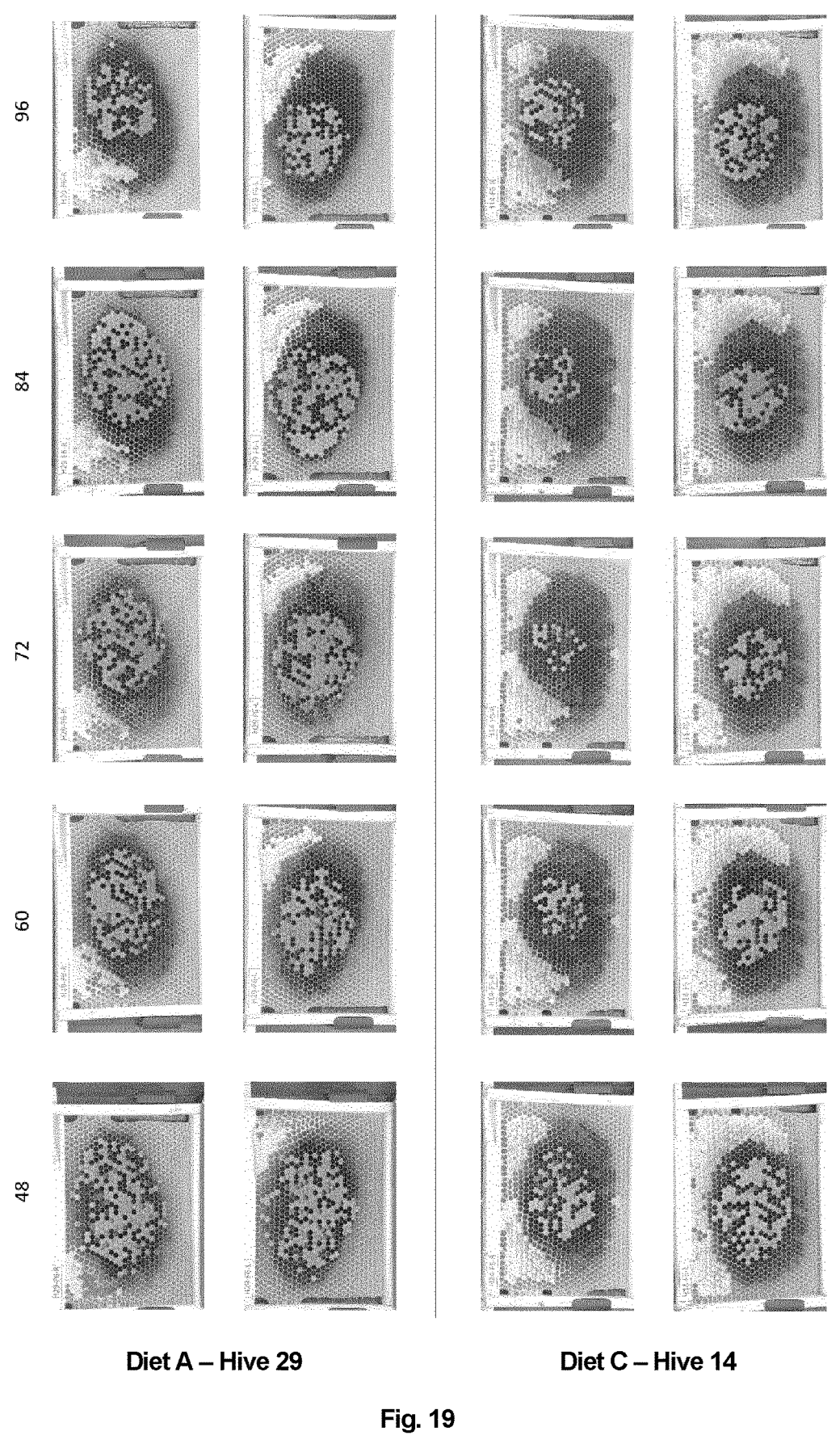

FIG. 19 shows photographs of the frames with brood in hive 29 (upper 2 rows) fed with Diet A and hive 14 (lower 2 rows) fed with Diet C on day 48, 60, 72, 84 and 96 after the start of the experiments of Example 7. Both hive 29 and 14 plot close the averages for hives fed Diet A and Diet C.

Figure 20:
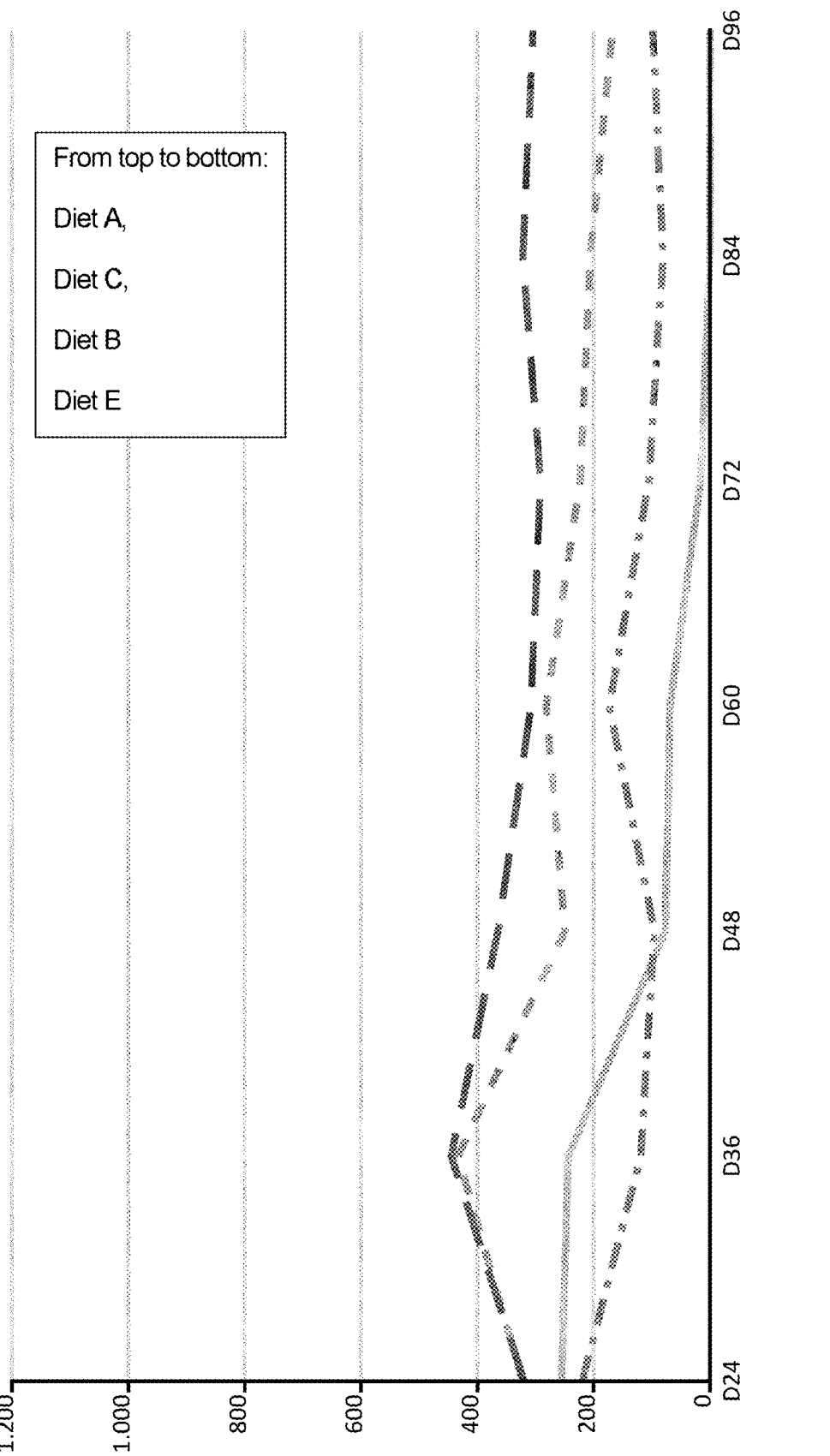

FIG. 20 shows the capped brood count in hives fed with Diet A, B, C and E according to Example 8 from time point day 24 to 96 after the start of placement in enclosed tent and start of feeding the diets (Raw data in table-6). The vertical axis shows the number of capped brood produced from day 24 to day 96. The horizontal axis shows day 24 to day 96 post start of placement of the hives in tented enclosures and start of feeding Diet A, B, C and E (commercial diet).

DETAILED DESCRIPTION OF THE INVENTION

Embodiments of the present inventions are described hereinafter.

Honeybees live in colonies. In standard industrial practice there are different sizes of colonies: an 8 frame colony which is industry standard contains ~20000 bees; a 10 frame colony ~24000; a large colony 12.5 frames in two stories=30000; a colony with 2 supers 50000 bees). Overall bee colonies have a variable size (+/−50% size increase/decrease around the year average depending on season and nutritional availability).

Rortais et al. 2005 (Apidologie, 36(1), 71-83), reviewed the bee's pollen consumption literature comprehensively and noted 10 up to 55 kg collected annually per colony.

Crailsheim et al. 1993 (J Insect Phys 38(6):409-419) calculated the annual pollen consumption in two colonies to be 13.4 and 17.8 kg respectively in colonies of about 25000 bees in June-August. Wille et al. 1982 (Revue Suisse de Zoologie 4: 897-914) recorded 10 to 26 kg pollen per year. It obviously depends on the colony size, colony development, environment and pollen type.

Keller et al. 2005 (Bee world, 86(1): 3-10) estimate that each worker bee requires between 140-180 mg pollen during its entire lifetime. If an entire colony raises between 100-200 k bees per year, this would result in a demand of 17-34 kg of pollen per colony. Crailsheim et al. 1993 (J Insect Phys 38(6):409-419) summarized the amount of pollen consumed per colony from 5 published articles. They also measured pollen consumption from two colonies that they measured. They estimate that the mean quantity of pollen needed for a colony producing ~150000 brood per year is 19 kg.

When bee colonies receive supplementary feeding in periods of pollen dearth, they typically receive supplementary food in the form of a protein patty or pollen patty, (most feeding regimes are "ad libitum") resulting in a consumption of ~1.5 to 2 to-3 pounds (0.680-1.35 kg) per 12.5 frames per 2 weeks. In the industry a frame of bees is defined as ~2400 bees (30000 bees in the colony) and the hives used in the industry can contain 5 or 8, 10 or 12 frames or even more. In the beginning of the spring season a hive is only partially populated (e.g., 5 frames of bees in a 10-frame hive) and as the season proceeds the bee population in that hive then expands to fill the 10-frame hive with 10 frames of bees. During the winter the colony then decreases its population to 5-6 frames of bees.

In calculating the dose of "mg pollen equivalent feed" required by bees, one needs to consider that pollen from different plant species contains a wide range of –50% sugar, protein and other constituents and that therefore the nutritional value of pollen varies by plant species (range+/–50%). Through supplementary feeding of pollen, pollen supplements or protein supplements, colonies receive a dose of ~1.5-~3 lb or (680 g to 1360 g) of pollen supplement per two weeks. On an annual basis this amounts to a range of 17.7 kg to 35.4 kg of pollen supplement food which is in range with published figures for a 10-frame colony eating pollen considering the variable nutritional qualities of pollen. For colonies of different size, the dose calculations are proportionally adjusted. (1 bee frame=~2400 bees).

Calculated based on the table from Roessink et al 2021 (J Apic Res 60: 659-654) a 30000-bee colony consumes 62 grams of pollen per day or 868 gram per 2 weeks (in the active flowering & bee multiplication season).

A more extensive description is given by the text and table in quotes below from: https://www.insignia-bee.eu/how-much-pollen-does-a-colony-need/

"Rortais et al. (2005), reviewed the bee's pollen consumption literature comprehensively and noted 10 up to 55 kg collected annually per colony. Crailsheim et al., calculated the annual pollen consumption in two colonies to be 13.4 and 17.8 kg respectively in colonies of about 25000 bees in June-August. Wille et al., recorded 10 to 26 kg pollen per year. It obviously depends on the colony size, colony development, environment and pollen type. For example, pollen of maize is consumed in about the double amount compared to mixed pollen, due to its relative low percentage of nutrients of the whole pollen grain. The percentage protein of the dry weight is comparable to mixed pollen (Höcherl et al, 12012). Obviously, there is no fixed amount a colony could or should collect to grow, maintain and function. Nevertheless, there are good studies available to assess the annual pollen need for a colony. Based on the aforementioned Rortais et al. (2005) article, a nurse bee consumes on average 65 mg pollen and a worker-larvae 5.40 mg. Consequently, a bee consumes in her life minimally 70.4 mg. This is the average estimation; double amounts have been reported as well. In the aforementioned Crailsheim et al study the pollen consumption per day was 3.4 to 4.3 mg. In a 30-days life span of the summer honeybee this is approximately 115 mg in her lifespan. Another approach to assess pollen consumption is presented in the review article of Keller et al., (2005a). It is the assessment of pollen consumption based on nitrogen (N) in brood and bees. Pollen is the solely N source in the bee's diet. To convert N to pollen, it is assumed that the pollen protein contains 16% nitrogen, that pollen contains 20% protein, and that the digestive efficiency is 80%. So, for 10 mg N, it takes 62.5 mg protein; for 62.5 mg protein it takes 312.5 mg pollen and by the efficacy of the alimentary process it takes 390.6 mg pollen consumed by the bee. Taking all this into account it takes 125 mg pollen to raise a bee. The N in the bees after emergence, increases by 0.86 mg. The 0.86 mg N correspond to 39 mg pollen. Therefore, in total each bees required minimally 125+39=164 mg pollen as N loss by defecation is not taken into account. Counting the bee's active and reproducing period on 200 days and the average life span of a bee of 35 days (Steen et al, 2012), it takes 200/35=6 generations. To maintain a colony of on average 15000 bees, 15000×6=90000 bees are raised. The number of bees raised annually, and the calculated amount of pollen required are summarized in table 1 [of this article].

The 35 kg mentioned in the beginning is the amount required for a big colony and is an optimal estimation. Amounts varying between 15 and 25 looks more realistic. Again, it all depends on pollen type, environment, colony development and yes/no pollen trap. Depriving colonies from pollen stimulated pollen collection. It is up to the beekeeper to maintain an adequate pollen flow. To check whether the pollen stores are sufficient it simply takes a rough estimation of the surface/number of beebread cells in a colony. A healthy normally sized colony needs/consumes per day about 0.5 to 2 $dm^2$ (200-800 half-full beebread cells). Another simple estimation is weighing the harvest of the pollen trap. It must be taken into account that the efficacy of the pollen trap varies between 10 and 50% (Keller et al., 2005b).

Table 1 from Roessink et al 2021, Beebread consumption by honeybees is fast: results of six-week field study, Journal of Apicultural Research, 60:659-664, shows an exemplary calculation of pollen requirement by a bee hive based on the consumption of pollen per day for a given size of colony. The larvae and nurse bees are the consumers of pollen. The older worker bees consume honey/nectar.

Pollen represents the natural food source for honeybees and pollen eating insects. Pollen is not optimized by the plant to feed insects (it is optimized for plant use=fertilisation). Pollen from different species contains a wide range of different protein, lipid, sterol, antioxidant molecules at widely different concentrations. Therefore, it is not yet known which of these constituents are beneficial and which ones are plant defence molecules to stop insects feeding on pollen and which are not important ingredients for insect nutrition and hence which are important to include and which are important to exclude from an artificial diet.

The inventors showed that the addition at a dose calculated for a colony of 30000 bees of between 0.14 to 12 grams isofucosterol over a 2-week period is beneficial to the performance of the colony and the bees (as seen in the production of bee brood and other fitness parameters such as longevity). This dose represents a concentration 0.01% to 1.76% isofucosterol in a 680-gram patty fed over a two-week period to a 30000-bee colony.

Calculated on a per non pollen supplement consuming bee in the hive (=the nurse bees=50% of the bees in the hive); this represents a dose of 140 mg/15000 bees=0.009 mg to 12000 mg/15000 bees=0.8 mg isofucosterol or fucosterol per nurse bee per 14 days in the hive (a nurse bee weighs 110 mg). This represents in % of bodyweight per day a dose of isofucosterol or fucosterol of 0.009/110*100/14=0,0006% to 0.8/110*100/14=0.052%.

Furthermore, the inventors show that the dose of isofucosterol or fucosterol of 0.0006% to 0.052% of bodyweight per day is beneficial to the production of larvae and adults of other pollen eating insects such as bumblebees, black soldier flies adults and larvae; lady bird beetle adults, hover flies and other pollen eating insects. In particular, it is important for adult fecundity and fertility and higher hatch percentage and survival of young larvae. The administration form affects the efficiency of uptake and bioavailability.

Methods of Administration

The administration to a bee colony or organism can be only for the period when a desired effect is needed: as short as a single administration to improve, induce or support normal brood development as bees come out of the winter, to induce or support queen breeding or when an insect needs to produce gametes or eggs, it can be for longer periods when bees are fed on a crop that produces nutritionally poor pollen (such as blueberries, carrots, . . . ) or throughout periods of pollen dearth in the spring, summer or fall. For colonies of different size the dose can be proportionally adjusted to the amount of bees or nurse bees present.

This biweekly dose of isofucosterol can be administered in different ways to a beehive or the fed insects: This dose of isofucosterol can be administered to the colony in different formulations (incorporated in suspended, dissolved, or emulsified form in a way that bees or the target animal readily ingests):

incorporated in the standard 1.5 to 3 pounds protein or pollen supplement patties administered per 2 weeks to a hive of 30000 bees wherein in one embodiment the composition comprises of isofucosterol or fucosterol or mixtures thereof in an amount from 0.01-5% of the diet, preferably from 0.01-2%, even more preferably from 0.01-1%, and even more preferably from 0.03-0.9% for honeybees and 0.03-0.8% for bumblebees as a percentage of the total weight of the pollen substitute composition.

more concentrated in small patty in which the concentration is then much higher e.g. up 33% sterol incorporated in or mixed with constituents that induce bees to eat the formulation such as pollen, sugar, oil/fat, honey, or protein or a mixture thereof, or spread in the colony or fed outside of the colony in a feeding station as powder or paste with the isofucosterol incorporated in or mixed with constituents that induce bees to eat the formulation such as pollen, sugar, oil/fat, honey, or protein or a mixture thereof, spread in the colony or fed outside of the colony in a feeding station a syrup, or liquid in which the isofucosterol is incorporated in or mixed with constituents that induce bees to eat the formulation such as pollen, sugar, oil/fat, honey, or protein or a mixture thereof, In another embodiment the dose sterol molecules can be delivered through a device that is injecting the sterol composition into the colony for example on a pre-programmed basis.

Or any methods that can be used to deliver the indicated dose such that the bees ingest a chemical or nutrient such as are known to people skilled in the art.

In another aspect the sterol mixture is not administered through a patty or similar diet but the above multiplicity and ratio of sterols are dissolved in an aqueous or oily medium or nutrient slush or other edible form and administered to the colony as a liquid for drinking, liquid paste or spray in the hive or powder. In this embodiment the dry weight concentration of the sterols can be 0.01-100% dry weight (since the water carrier is evaporated from the administered medium).

Effect of Feeding of Isofucosterol Combined with Other Sterols:

The inventors furthermore show that a combination of isofucosterol and/or cholesterol, and/or 24-Methylenecholesterol, and/or beta-sitosterol, and/or stigmasterol and/or campesterol represents (1) an improvement overfeeding isofucosterol alone,
   (2) an improvement overfeeding combinations of the above sterols w/o isofucosterol,
   (3) an improvement overfeeding combinations of the above sterols lacking cholesterol or 24-Methylenecholesterol, or campesterol, or stigmasterol or beta-sitosterol.

Surprisingly, a bee colony fed a diet containing isofucosterol and a multiplicity of sterols including 24-Methylenecholesterol, cholesterol, isofucosterol and campesterol, beta-sitosterol or stigmasterol can support brood development for more than 4 cycles. The same diet without isofucosterol cannot do so. Importantly in our experiments the rate of brood production levels off to a stable level. This trajectory demonstrates that our diet supplies an adequate level of essential nutrients permitting indefinite brood production. This means that such diet can act as a pollen replacement to the bee colony over this period. Therefore, isofucosterol in this diet makes beekeeping independent of pollen resources in a natural setting or agricultural setting. In bumblebees, such diet with a multiplicity of sterols makes it possible for founding queen bees to rear larvae to adulthood, without need for pollen.

Creating such recipe, is not obvious from the literature. For example, Rasmont et al. (2005 J Econ Ent 98(3): 656-663) interpreted the data from Herbert et al. (1980) where honeybees were fed with artificial diets containing only one sterol to indicate that sitosterol and stigmasterol were an antifeedant to honeybees and not essential.

The inventors extended the utility of the invented diet from honeybees to other pollen eating insects with commercial relevance in biocontrol (e.g., lady bird beetles), insect biomass production (e.g. Black soldier fly) and pollination (Hoverflies).

There is an urgent need for changes to animal husbandry and livestock feeding which make use of waste materials created through food production. Additionally, methods for protecting crops from agricultural pests which do not rely on agrochemicals such as the production and release of natural insect predators such as ladybird beetles and hoverflies are an important means of creating integrated pest management strategies that reduce environmental impacts and protect biodiversity.

An important emerging means of making use of industrial agricultural waste is cultivation of fly larvae in waste material such as the black soldier fly (Hermetia illucens).

Black soldier fly larvae are omnivorous generalists and can be fed with plant or animal waste, including feces, making them an advantageous means of converting waste biomass into feed for livestock. In agricultural production, these larvae and pupae are fed to poultry and fish. These insects acquire nutrients from the diet they consume as larvae which are valuable additions to the food chain, such as fatty acids and sterols (Boukid et al. 2021 Insects 12, 672. https://doi.org/10.3390/insects12080672). However, diets like industrial human waste have not been optimized for black soldier flies and are often missing key essential nutrients. For example, the development time, size, and mortality of BSF fed larvae are strongly influenced by the nature of the food they are cultivated on (Lalander et al. 2019. J Cleaner Production, https://doi.org/10.1016/j.jclepro.2018.10.017). Delayed development times due to suboptimal diets reduce efficiency in rearing systems.

Another problem with existing rearing methods is suboptimal diets for life history stages. Holometabolous insects often consume different foods as larvae and adults. Each life history stage has substantially different nutritional requirements. What is fed to larvae in laboratory or industrial production settings may not be suitable for adult fecundity and survival.

In the wild, BSF larvae eat decaying organic material and adult BSF eat floral pollen. Like larvae, adult BSF also require protein; they produce more eggs when fed with protein (Bertinetti et al. 2019. *Journal of Insect Science* 19(1): 19; 1-7). Even though protein improves performance, egg mass size and hatching of eggs in protein fed laboratory reared flies is less than half of that of wild fed flies (Bertinetti et al. 2019). It is likely that certain nutrients are missing from laboratory diets which have not yet been identified (Bertinetti et al. 2019). Adult performance is important because adults produce eggs which are a rate-limiting step in industrial production (Cickova et al. 2015 Waste Management Volume 35, January 2015, 68-80).

Bertinetti et al. (2019) speculate that pollen has key nutrients that BSF need. Recently, black soldierflies have been shown to have much improved oviposition performance when fed with a diet that contains floral pollen (Thin and Kanoi. 2022. JARQ 56 (2): 211-217). For example, oviposition and egg hatching is doubled and lifespan is increased by 30% when female black soldier flies are fed with pollen (Thin and Kanoi 2022). However, the components of pollen that cause this change are unknown.

Pollen feeding in other beneficial insects using in agriculture also impacts adult insect fecundity. This is particularly important in insects cultivated for biocontrol such as ladybird beetles (Coccinelidae) and hoverflies (Syrphidae). For example, ladybird beetle larvae will feed on pollen when aphids, their preferred prey, are not available (Berkvens et al. 2010 Eur. J. Entomol. 107: 189-195, 2010, Shuldiner-Harpez and Coll. 2017 J Insect Behav 30: 432-438). Importantly, pollen feeding by adult beetles has been shown to be required for fertility; male beetles that do not feed on pollen are unable to produce viable spermatozoa (Ugine et al. 2019 Ecology Letters 22: 275-283). Pollen feeding is also an essential component of the fecundity of hover flies (Syrphidae) which are important pollinators and predators of aphids (Hickman et al. 1995 New Zealand Journal of Zoology 22: 387-392). Female hoverflies are very selective of the types of pollen that they feed; the type of pollen influences their fecundity and the survival of their offspring (Amorous-Jimenez et al. 2014 BioControl 59:427-435).

Pollen contains many different phytosterols which are not found in other terrestrial plant or animal sources (Zu et al.

2020. New Phyt 230: 1169-1184). These sterols have a wide range of functions in the plant and outside the plant. Many phytosterols are produced by plants to inhibit feeding of insects on the plant.

The present inventors have surprisingly established that isofucosterol, a common sterol found in pollen, is an essential nutrient for pollen feeding insects. Isofucosterol delivered through a pollen-free diet increases the performance of adult and larval BSF. The present inventors have also identified that the main sterol component of pollens selected by adult female hoverflies is isofucosterol. The present inventors have further found that the combination of isofucosterol and at least one further sterol, in particular cholesterol, 24-Methylenecholesterol, and other phytosterols, in particular campesterol, beta-sitosterol or stigmasterol delivers higher growth and/or health performance in many invertebrates, in particular Holometabolous insects including bees and pollen feeding flies, moths/butterflies, and beetles.

The inventors furthermore established that feeding a combination of isofucosterol, cholesterol, 24-Methylenecholesterol, beta-sitosterol, stigmasterol and campesterol represents (1) an improvement over isofucosterol alone, (2) an improvement over combinations of the above sterols w/o isofucosterol, (3) an improvement over combinations of the above sterols lacking cholesterol or 24-Methylenecholesterol, campesterol, stigmasterol or beta-sitosterol.

Surprisingly, feeding cultivated Black Soldier Fly or beetle adults with a diet containing isofucosterol and a sterol mixture improves egg laying and egg hatching performance and adult longevity. The same effect can be obtained by feeding the larvae that will produce the brood stock with a diet containing isofucosterol and a sterol mixture (adults inherit substantial nutrition reserves from their larval/pupal stage). This means that such a diet can act as a pollen replacement and a form of supplemental nutrition to lab reared insect colonies. Therefore, this diet makes it possible to optimize larval development times and adult fecundity in industrial cultures of beneficial insects.

This is not obvious from the literature. Svoboda, a world leading researcher of insect sterols, teaches that in all but two species, cholesterol supplies a dietary need for sterol when it is present in diet (Svoboda. 1999. *Critical Reviews in Biochemistry and Molecular Biology*, 34(1):49-57). His summary did not recognize the need for sterols from pollen as essential nutrients for many pollen feeding insects. He did not recognize isofucosterol as a necessary sterol for holometabolous larval growth or adult insect fecundity.

Accordingly, a first aspect of the invention is a method for feeding bees such as honeybees and bumblebees and pollen or algae consuming animals such as ladybird beetles, black soldier fly, hoverfly, oysters, shrimp, and fish larvae comprising:

providing a pollen substitute formulation comprising a nutritionally effective amount of isofucosterol, fucosterol or a mixture thereof;

administering the pollen substitute formulation to animals such honeybees and bumblebees and pollen or algae consuming animals such as ladybird beetles, black soldier fly, hoverfly, oysters, shrimp, and fish larvae.

Nutritionally Effective Amount

In a preferred aspect, the dosage of administration of the pollen substitute formulation containing isofucosterol or fucosterol or a mixture thereof and the further sterols from the group consisting of cholesterol, 24-Methylenecholesterol, campesterol, stigmasterol and beta-sitosterol, results in a total biweekly dosage of the above group of sterols to a colony of 30000 bees of 0.2 to 48 grams, preferably from 0.4 grams to 36 grams and even more preferably from 0.6 to 20 grams whereby the 100% of the sterols in the doses indicated above are divided as follows: isofucosterol-fucosterol is 10-60% of the sterol dose; the remainder of the sterols or multiplicity of sterols representing the remainder of the total sterol dose.

In a preferred embodiment the 100% doses of the group of sterols consisting of isofucosterol/fucosterol and/or cholesterol, and/or 24-Methylenecholesterol, and/or the phytosterols consisting of campesterol and/or stigmasterol and/or beta-sitosterol in the diet for a colony of 30,000 bees over a 14 day period is 0.3 gram to 20 gram of a composition of which 10-60% is isofucosterol and/or 0-50% is cholesterol and/or 0-50% 24-Methylenecholesterol and/or 0-50% of a mixture of beta-sitosterol and/or stigmasterol and/or campesterol.

This represents a dose range per day of the "sterol composition" of 0.001% (Formula=0.3/14/1650×100) of the insect body weight consuming the food to 0.087% (Formula=20/14/1650×100) of the insect body weight consuming the food whereby of the sterol composition 10-60% is isofucosterol and/or 0-50% is cholesterol and or 0-50% 24-Methylenecholesterol and/or 0-50% of a mixture of beta-sitosterol and/or stigmasterol and/or campesterol.

This calculation is based on 50% of the bees being nurse bees each weighing 110 mg.

The overall dose can be proportionally adapted for larger or smaller insects, invertebrates, insect colonies and shorter or longer feeding intervals whereby the unit dose indicated here is for a 14 day period of colony of 30000 bees. (see table above from Keller et al., 2005b).

The same compositions and dose ranges apply to other pollen eating insects.

In another embodiment, some or all of these sterol moieties can be delivered as a prodrug such as a water-soluble sterol glycoside or a sterol sulphate or similar salt, or lipid-soluble form such as a sterol-ester or other similar prodrug forms in which the dose is adjusted to represent the fraction of the Molecular Weight of the respective sterol nucleus in the overall molecular weight of the conjugated sterol molecule.

The different methods of administration described above for isofucosterol can be applied to isofucosterol and the other sterol(s) described here.

To calculate the dose of the isofucosterol and groups of sterols to be delivered to other pollen eating insects (see above) as % body weight per day the following formula is used:

[30000/2]*0.110 gr="Weight of the non-pollen supplement consuming insects (nurse bees and/or larvae) in a hive of 30000 bees" (@0.11 gram per nurse bee and/or larvae; @30000 bees in the hive 50% of which are nurse bees and/or larvae=1650 grams)

["Dose of a given sterol or group of sterols delivered in a 14-day period to a colony of 30000 bees"/14]="daily dose of sterol(s) administered"

"Daily dose administered in gram"/ "Weight of the non-pollen supplement consuming insects (nurse bees & larvae) in a hive of 30000 bees in gram"×100="% body weight of sterol(s) administered per day per gram of insect body weight"

Amount to be dosed of the sterols to a bumblebee colony:

"% body weight of sterol(s) administered per day per gram of insect body weight"×"weight of the insects (nurse bees and larvae) to be fed"

On average—see table above ⅔ of the pollen consumed in a colony is consumed by nurse bees and ⅓ by larvae present (see table above).

In a preferred embodiment wherein the group of sterols consisting of isofucosterol/fucosterol and/or cholesterol, and/or 24-Methylenecholesterol, and/or the phytosterols consisting of campesterol and/or stigmasterol and/or beta-sitosterol is dosed via a 1.5 to 3 pound patty per 14 days to a colony of 30000 bees the patty contains isofucosterol (0.01-2%, preferably 0.01-1%, more preferably 0.03-0.6% feed dry weight) or fucosterol (0.01-2%, preferably 0.01-1%, more preferably 0.03-0.6% feed dry weight) or a mixture thereof (total of 0.01-2%, preferably 0.001-1%, more preferably 0.03-0.6% feed dry weight) and at least one of the further sterols that are chosen from the group below (concentrations in % feed dry weight); resulting in a multiplicity of isofucosterol or fucosterol or a mixture thereof with at least one of the further sterols:

Cholesterol 0.001-2%, preferably 0.001%-1.5%, more preferably 0.06-1.2%, and/or

24-Methylenecholesterol 0.001-2%, preferably 0.001%-1.5%, more preferably 0.06-1.2% and/or Beta-sitosterol 0.001-2%, preferably 0.001-1%, more preferably 0.03-0.6% and/or Campesterol 0.001-2%, preferably 0.001-1%, more preferably 0.02-0.35% and/or Stigmasterol 0.001-2%, preferably 0.001-1%, more preferably 0.01-0.2% and/or or any combination thereof, whereby the total concentration of sterols is in a range of 0.01 to 4% (dry weight).

In another aspect, the composition is administered to invertebrates of the *Apis* or *Bombus* genera, in particular honeybees or bumblebees.

In another aspect, the source of the isofucosterol, fucosterol or a mixture thereof or of the at least one further sterol selected from the group consisting of cholesterol, 24-Methylenecholesterol, stigmasterol, campesterol, and beta-sitosterol is a pollen substitute tissue of one or more plant species selected from the group consisting of leaves, stems, roots, tubers, flowers, seeds, barks and fruits and combinations thereof.

In another aspect the source of the isofucosterol, fucosterol or a mixture thereof or of the at least one further sterol selected from the group consisting of cholesterol, 24-Methylenecholesterol, campesterol, stigmasterol and beta-sitosterol is an animal source, chemical synthesis or in vitro enzymatic synthesis, or a natural or metabolically engineered microorganism such yeast, algae or diatoms or a combination of such sources.

In another aspect, the source of the isofucosterol, fucosterol or a mixture thereof or of the at least one further sterol selected from the group consisting of cholesterol, 24-Methylenecholesterol, stigmasterol, campesterol, and beta-sitosterol is an extract, an oil, or a refinement of a pollen substitute tissue of one or more plant species or a combination thereof.

In another aspect, the source of the isofucosterol, fucosterol or a mixture thereof or of the at least one further sterol selected from the group consisting of cholesterol, 24-Methylenecholesterol, stigmasterol, campesterol, and beta-sitosterol is a pollen substitute tissue of one or more plant species selected from the group consisting of Solanaceae, Poaceae, Ranunculaceae, Fabaceae, Corylaceae.

In another aspect, the source of the isofucosterol, fucosterol or a mixture thereof is a pollen substitute source selected from the group consisting of:

a marine or freshwater algal species, in particular an extract, an oil or a refinement of *Ulva lactuca;* a marine diatom species, in particular an extract, an oil or a refinement of *Thalassiosira pseudonana, Thalassiosira rotula,* or *Chaetoceros muelleri;* and a fungus, in particular an extract, an oil or a refinement of *Saccharomyces cerevesiae,* or *Yarrowia lipolytica.*

In another aspect, the isofucosterol or fucosterol is chemically or enzymatically synthesized or obtained by genetically modified host organisms such as fungi, bacteria, or algae.

In another aspect, the source of the isofucosterol, fucosterol or a mixture thereof and/or the at least one further sterol selected from the group consisting of cholesterol, 24-Methylenecholesterol, stigmasterol, campesterol, and beta-sitosterol is selected from the group consisting of algae, plant, fungus, algae, diatom and combinations thereof and wherein source of the isofucosterol, fucosterol or a mixture thereof and of the at least one further sterol selected from the group consisting of cholesterol, 24-Methylenecholesterol, stigmasterol, campesterol, and beta-sitosterol is a pollen substitute tissue.

In another aspect, the isofucosterol, fucosterol or a mixture thereof and/or the at least one further sterol selected from the group consisting of cholesterol, 24-Methylenecholesterol, campesterol, and beta-sitosterol and stigmasterol is provided to a eusocial, or primitively eusocial, bee colony from a synthetic source.

In another aspect, the isofucosterol, fucosterol or a mixture thereof and/or the at least one further sterol selected from the group consisting of cholesterol, 24-Methylenecholesterol, campesterol, stigmasterol and beta-sitosterol is provided as part of a pollen substitute composition, wherein the pollen substitute composition comprises:

proteins in an amount from 10 w % to 50 w %, preferably of 15 w % to 40 w %, fatty acids in an amount from 1 w % to 20 w %, preferably of 2 w % to 12 w %, carbohydrates in an amount from 20 w % to 90 w %, preferably of 30 w % to 70 w %, optionally vitamins, and optionally minerals, wherein the total amount of components and optionally further components add up to 100 w % and wherein the w % are related to the total dry weight of the composition.

Administration Via a Liquid or Semi-Liquid Experiment:

In another aspect, the isofucosterol, fucosterol or a mixture thereof and/or the at least one further sterol selected from the group consisting of cholesterol, 24-Methylenecholesterol, campesterol, stigmasterol and beta-sitosterol is provided as part of a liquid or semiliquid feed supplement to which optionally an appetite stimulant such as sugar, or any other appetite stimulant is added, wherein the liquid or semi liquid feed supplement composition comprises:

optionally proteins in an amount from 10 w % to 50 w %, preferably of 15 w % to 40 w %, optionally fatty acids in an amount from 1 w % to 20 w %, preferably of 2 w % to 12 w %, optionally carbohydrates in an amount from 20 w % to 90 w %, preferably of 30 w % to 70 w %, optionally vitamins, and optionally minerals, optionally water or another solvent wherein the total amount of components and optionally further components add up to 100 w % and wherein the w % are related to the total dry weight of the composition.

In another aspect, the composition is essentially free of pollen.

Isofucosterol and Fucosterol

Figure 1:
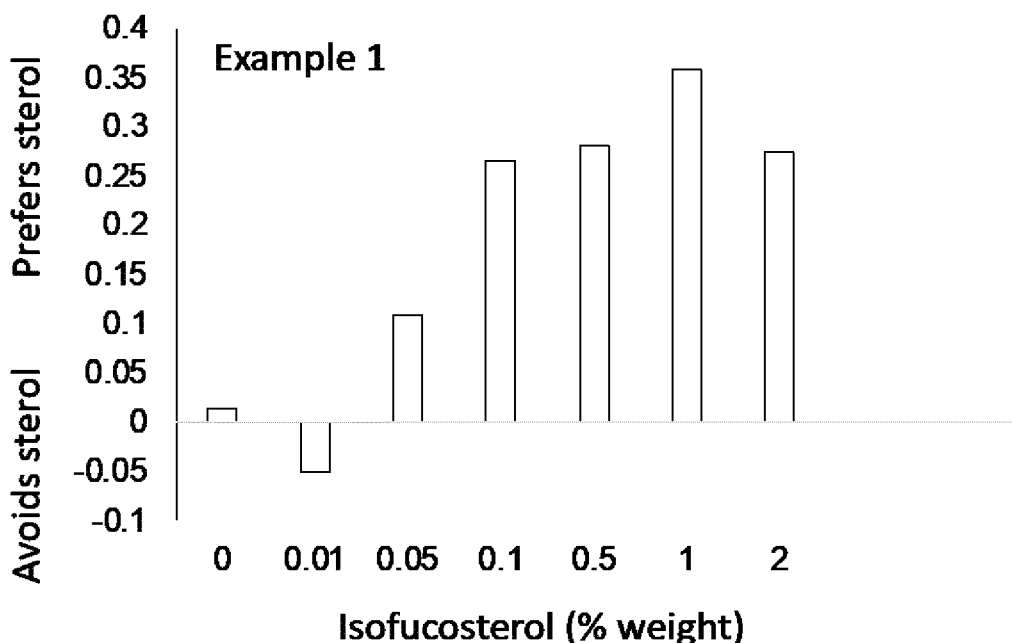
FIG. 1 shows the choice of cohorts of bees of diet with or without isofucosterol.
Figure 2:
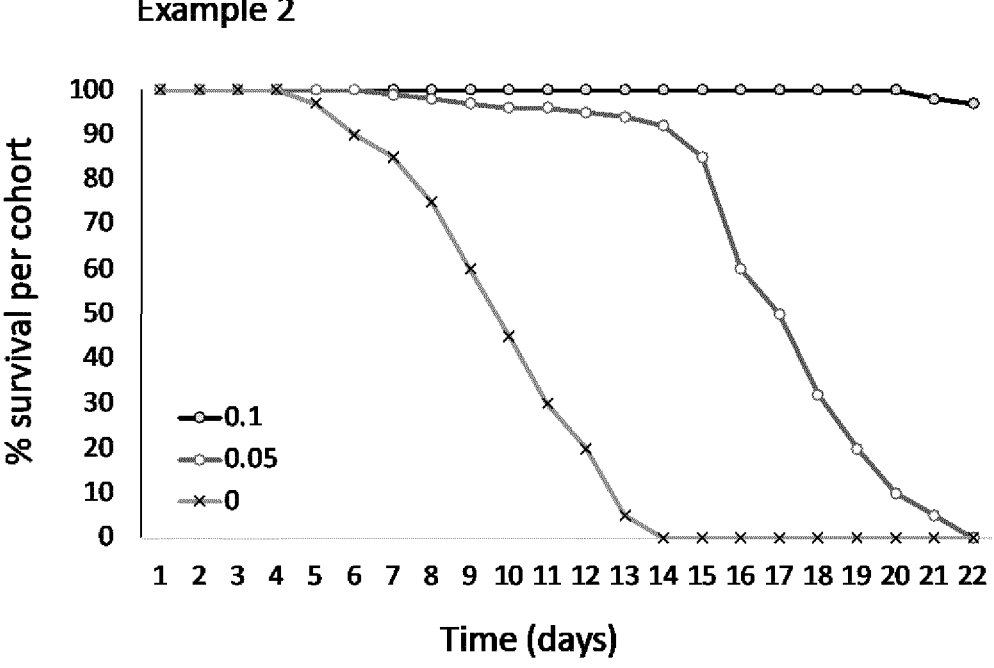
FIG. 2 shows the survival of cohorts of bees confined to feed on diets containing specific concentrations of isofucosterol.

Isofucosterol is a delta-5 sterol of the structural formula (FIG. 1):

Fucosterol is a delta-5 sterol of the structural formula (FIG. 2):

The structure of isofucosterol/fucosterol is described in https://en.wikipedia.org/wiki/Isofucosterol and https://pubchem.ncbi.nlm.nih.gov/compound/5281326

24-Methylenecholesterol

Figure 3:
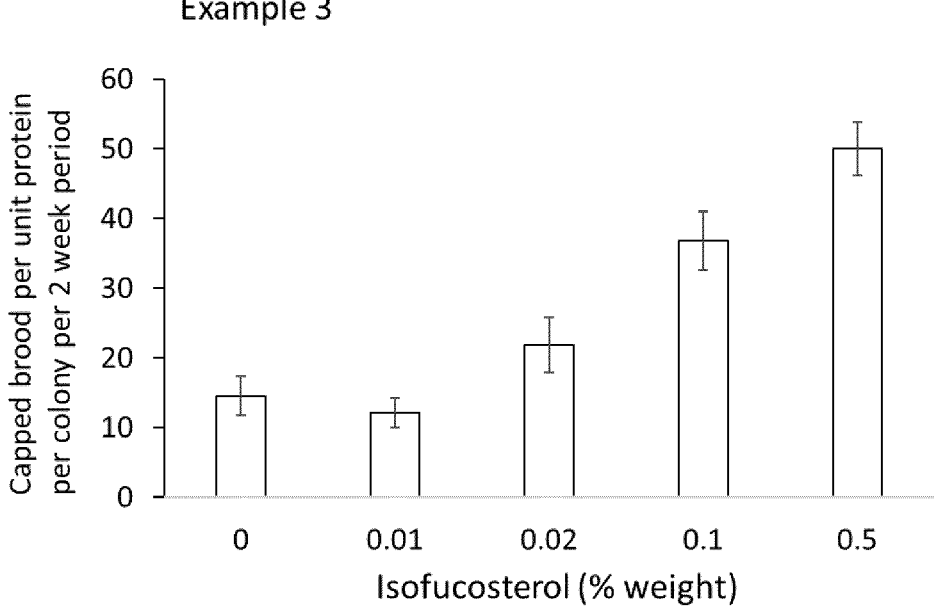
FIG. 3 shows the threshold for the influence of isofucosterol in bee diet.

The structure of 24-Methylenecholesterol is described here: https://pubchem.ncbi.nkm.nih.gov/compound/24-Methylenecholesterol Isofucosterol and 24-Methylenecholesterol were synthesized by chemists skilled in the art of organic synthesis and the end product purified to 99% purity and characterized by LCMS, NMR, and Liquid chromatography (FIG. 3, 4, 5). Isofucosterol and 24-Methylenecholesterol can also be purified from natural sources, such as pollen collected by bees. Cholesterol was from a commercial source. B-sitosterol and other sterols were purified from commercially available soy phytosterols using standard methods.

Physiologically Active Sterol Conjugates

Physiologically active sterol conjugates mean conjugates of sterols that can be metabolized by invertebrates or aquaculture or plant organisms.

The sterol molecules 24-Methylenecholesterol, beta-sitosterol, cholesterol, campesterol, isofucosterol/fucosterol, stigmasterol can be provided in the food in different conjugates and as a mixture of conjugates.

The concentration of sterol administered in the conjugate mix is calculated as follows:

'Dose of sterol conjugate Molecular Weight of sterol conjugate'/'Molecular Weight of sterol'בDose of sterol desired'='dose of sterol conjugates desired'.

Examples of the different sterol conjugates are:

as a free alcohol esterified with a fatty acid (such as but not limited to palmitic acid, stearic acid, linoleic, oleic, stearic, lino-lenic acid).

linked via the alcohol group to a fatty alcohol (sterol alkyl ethers), esterified by an acid such as sulfuric acid (sterol sulfate)

linked to a glucide (resulting in a steryl glycoside). The sterol group at the 3-OH position can be any sterol of the sterol group 24-Methylenecholesterol, beta-sitos-terol, cholesterol, campesterol, isofucosterol/fucos-terol, stigmasterol. The sugar glucose can be glucose, galactose, mannose, xylose, arabinose. A preferred embodiment is the glucose ester of the group of sterols.

esterified to g trans-hydroxycinnamate, ferulate (4-hy-droxy-3-methoxycinnamate) and p-coumarate esters (see the figure of below of campesteryl ferulate as example of the steryl phenolate conjugates). A pre-ferred embodiment is the coumaric acid ester of the group of sterols.

Preferred examples of sterol conjugates are:

Examples of beta-sitosterol conjugates include:

β-sitosterol o-coumarate

αCG

αCAG

αCPG

25

β-sitosterol ferulate

β-sitosterol m-coumarate

β-sitosterol caffeate

β-sitosterol gallate

β-sitosterol sinapate

26

β-sitosterol vanillate

β-sitosterol phloretate

Similar to the beta-sitosterol examples above, conjugates with 24-methylene cholesterol, isofucosterol, campesterol or cholesterol or stigmasterol can be used.

Further preferred sterol conjugates naturally occur in plants, such as (A) steryl ester (SE), (B) steryl glycoside (SG), (C) acyl steryl glycoside (ASG) with the structural formula:

A

B

-continued

C

R-side chain, which can in the case of this patent can be of the group of cholesterol, isofucosterol, 24-Methylenecholesterol, campesterol, beta-sitosterol, stigmasterol.

Further examples include steryl-glycoside, steryl ester and acetylated steryl glycoside.

Free sterol

Free sterol

Steryl ester

-continued

Acetylated steryl glycoside

R is the side groups of the sterol. The sterol can be a delta-5 or delta-7 sterol.

Further examples of sterol conjugates include:

β-sitosterol-β-glucoside

R = H = sterol glucoside
R = OC·R' = acyl sterol glucoside campesteryl
ferulate a)

Steryl palmitate

-continued b)

Steryl ferulate c)

Steryl glycoside d)

Steryl glucopalmitate

Cholesterol

-continued

Sitosteryl oleate

Campesterol

R = ——OH
-fatty acid

Stigmasterol

R = ——OH
-fatty acid

Brassicasterol

R = ——OH
-fatty acid

Isofucosterol as Insect Nutrient

The present inventors have surprisingly found that isofu-costerol is an essential bee and other pollen eating insect nutrient. Honeybees and bumblebees for example show the following levels of isofucosterol in their body composition:

TABLE 1

| Isofucosterol composition of bees and potential food substrates for bees as a percentage total bee-relevant phytosterols | | |
| --- | --- | --- |
| | Isofucosterol (% total) | Total phytosterol (µg/g) |
| Honeybee worker | 28.73 | 1673.75 |
| Bumblebee worker | 50.15 | 2101.26 |

Pollen Substitute Composition

The feature "pollen substitute" means essentially free of pollen. However, minor amounts of pollen may be present in the compositions of the present inventions. In one embodiment, the amount of pollen is 15 w % or less, preferably 10 w % or less, even more preferably 5 w % or less and even more preferably 1 w % or less and even more preferably 0.1 w % or less as compared to the dry weight of the composition. The term pollen substitute and non-pollen are used interchangeably.

Pollen Substitute Sources of Isofucosterol

Isofucosterol may be obtained from pollen substitute sources for example through synthetic chemical synthesis; or any pollen substitute plant source.

Examples of pollen substitute plant sources of isofucosterol include alga, fungus, bacteria, or animal parts that contain isofucosterol.

In one embodiment, the pollen substitute sources naturally contain isofucosterol.

In another embodiment, the pollen substitute sources of isofucosterol are organisms metabolically engineered to produce isofucosterol.

Invertebrates

Invertebrates include arthropods, such as insects, arachnids, crustaceans, and myriapods, molluscs, such as chitons, snails, bivalves, squids, and octopuses, annelid, such as earthworms and leeches; and cnidarians, such as hydras, jellyfishes, sea anemones, and corals.

Preferred invertebrates are invertebrates that are cultured or farmed for purposes of human or animal nutrition such as honeybees, bumblebees, earthworms, meal worms, shrimps, prawns or crayfish, crickets, fly larvae ladybird beetles, black soldier flies, hoverflies, and oysters or other bivalves. Particularly preferred invertebrates are those of the Apidae or Bombidae family which are used as pollinators for agricultural or horticultural plants, such as bees of the genus *Apis* and in particular *Apis mellifera, Apis cerana, Apis dorsata* or bumblebees of the genus *Bombus* and in particular *Bombus terrestris, B. impatiens, B. ignites* stingless honeybees of the tribe Meliponini

Dosage and Concentration

The dose and concentrations in the examples described below are for feeding a colony of 30000 bees with a 1.5 pound to 3 pounds of a bee patty over a period of 14 days. The dose of the patty can be adapted to the size of the colony and the dose per 14 days can be repeated as desired by the beekeeper. The same doses can be delivered in embodiments whereby the administration is not through patties but through other forms as described above. The formulae for calculating the dose for different formulations, methods of administration or size of bee colonies or as dose/day as % of insect biomass are described above.

In one embodiment, the isofucosterol or the fucosterol is administered in an amount that is nutritionally effective for invertebrates, in particular for honeybees or bumblebees.

In one embodiment, nutritionally effective involves feeding a colony of 30000 bees with 1 pound to 1.5 to 3 pounds of a bee patty formulation over a period of 14 days that has a concentration of isofucosterol or fucosterol or mixtures thereof in an amount from 0.01-5%, preferably from 0.01 to 2%, even more preferably from 0.01-1% as a percentage of the total weight of the pollen substitute composition. In another embodiment, the concentration of isofucosterol or fucosterol or mixtures thereof is from 0.03-0.5% for honeybees or 0.03-1% for bumblebees as a percentage of the total weight of the pollen substitute composition. The dose of the patty can be adapted to the size of the colony and the dose per 14 days can be repeated as desired by the beekeeper.

In one embodiment, the cholesterol is administered in an amount that is nutritionally effective for invertebrates, in particular for honeybees or bumblebees. Preferably the cholesterol is administered in a concentration of 0.001-2%, preferably 0.001%-1.5%, more preferably 0.06-1.2% by dry weight of the total pollen substitute composition.

In one embodiment, the 24-Methylenecholesterol is administered in an amount that is nutritionally effective for invertebrates, in particular for honeybees or bumblebees. Preferably the 24-Methylenecholesterol is administered in a concentration of 0.001-2%, preferably 0.001%-1.5%, more preferably 0.06-1.2% by dry weight of the total pollen substitute composition.

In one embodiment, the sitosterol is administered in an amount that is nutritionally effective for invertebrates, in particular for honeybees or bumblebees. Preferably the sitosterol is administered in a concentration of 0.001-2%, preferably 0.001-1%, more preferably 0.03-0.6% by dry weight of the total pollen substitute composition.

In one embodiment, the campesterol is administered in an amount that is nutritionally effective for invertebrates, in particular for honeybees or bumblebees. Preferably the campesterol is administered in a concentration of 0.001-2%, preferably 0.001-1%, more preferably 0.02-0.35% by dry weight of the total pollen substitute composition.

In one embodiment, the stigmasterol is administered in an amount that is nutritionally effective for invertebrates, in particular for honeybees or bumblebees. Preferably the stigmasterol is administered in a concentration of 0.001-2%, preferably 0.001-1%, more preferably 0.01-0.2% by dry weight of the pollen substitute composition.

In one embodiment, the total concentration of sterol in the pollen substitute composition is in the range of 0.01% to 4% by dry weight of the pollen substitute composition.

Pollen Substitute Composition

A further aspect of the invention is a pollen substitute composition comprising a. proteins in an amount from 10 w % to 50 w %, preferably of 15 w % to 40 w %, b. fatty acids in an amount from 1 w % to 20 w %, preferably of 2 w % to 12 w %, c. carbohydrates in an amount from 30 w % to 90 w %, preferably of 30 w % to 70 w %, d. optionally vitamins, and e. optionally minerals, wherein the total amount of components a) to e) and optionally further components add up to 100 w % and wherein the w % are related to the total dry weight of the composition, wherein the pollen substitute composition further comprises a nutritionally effective amount of isofucosterol, fucosterol or a mixture thereof, and wherein the pollen substitute composition further comprises, at least one further sterol from the group consisting of cholesterol, 24-Methylenecholesterol, campesterol, stigmasterol and beta-sitosterol, wherein, in a preferred embodiment, the total concentration of sterols is from 0.01 w % to 4 w %, preferably from 0.05 w % to 3 w % and even more preferably from 0.05 w % to 2 w %, and even more preferably from 0.05 w % to 1.5 w % as compared to the total weight of the pollen substitute composition.

Use for Feeding

A further aspect of the invention is the use of the pollen substitute composition of the invention comprising a nutritionally effective amount of isofucosterol, fucosterol or a mixture thereof for feeding invertebrates or aquaculture organisms, wherein the pollen substitute composition comprises a nutritionally effective amount of at least one further sterol, preferably at least two further sterols selected from the group consisting of cholesterol, 24-Methylenecholesterol, campesterol, stigmasterol and beta-sitosterol or a physiologically available conjugate thereof A further aspect of the invention is the use of the pollen substitute composition of the invention for feeding invertebrates or aquaculture organisms, wherein the pollen substitute composition comprises:

a. proteins in an amount from 10 w % to 50 w %, preferably of 15 w % to 40 w %, b. fatty acids in an amount from 1 w % to 20 w %, preferably of 2 w % to 12 w %, c. carbohydrates in an amount from 30 w % to 90 w %, preferably of 30 w % to 70 w %, d. optionally vitamins, and e. optionally minerals, wherein the total amount of components a) to e) and optionally further components add up to 100 w % and wherein the w % are related to the total dry weight of the composition, wherein the pollen substitute composition further comprises a nutritionally effective amount of isofucosterol, fucosterol or a mixture thereof, and wherein the pollen substitute composition further comprises, at least one further sterol from the group consisting of cholesterol, 24-Methylenecholesterol, campesterol, stigmasterol and beta-sitosterol, and wherein, in a preferred embodiment, the total concentration of sterols is from 0.01 w % to 4 w %, preferably from 0.05 w % to 3 w % and even more preferably from 0.05 w % to 2 w %, and even more preferably from 0.05 w % to 1.5 w % as compared to the total weight of the pollen substitute composition.

Further Composition Components

A further aspect is a method for feeding invertebrates, in particular honeybees, wherein a pollen substitute composition is administered, wherein the pollen substitute composition comprises:

a. proteins in an amount from 10 w % to 50 w %, preferably of 15 w % to 40 w %, b. fatty acids in an amount from 1 w % to 20 w %, preferably of 2 w % to 12 w %, c. carbohydrates in an amount from 30 w % to 90 w %, preferably of 30 w % to 70 w %, d. optionally vitamins, and e. optionally minerals, wherein the total amount of components a) to e) and optionally further components add up to 100 w % and wherein the w % are related to the total dry weight of the composition, wherein the pollen substitute composition further comprises a nutritionally effective amount of isofucosterol, fucosterol or a mixture thereof, and wherein the pollen substitute composition further comprises, at least one further sterol from the group consisting of cholesterol, 24-methylene-cholesterol, campesterol, stigmasterol and beta-sitosterol, wherein, in a preferred embodiment, the total concentration of sterols is from 0.01 w % to 4 w %, preferably from 0.05 w % to 3 w % and even more preferably from 0.05 w % to 2 w % and even more preferably from 0.05 w % to 1.5 w % as compared to the total weight of the pollen substitute composition.

The same composition and ranges apply to bumblebees, Black soldier flies, ladybird beetles and other pollen eating insects.

EXAMPLES

Comparative Example 1: Isofucosterol Levels in Commercial Bee Feed

Commercially available pollen substitute bee feed compositions do not comprise isofucosterol as shown in Table 1 below.

TABLE 1

| Commercially available honeybee feeds | | |
|---|---|---|
| | Isofucosterol | Total phytosterols (microg/g) |
| UltraBee | below detection limit | 2147.29 |
| MegaBee | below detection limit | 1489.84 |
| AP23 | below detection limit | 1340.88 |
| BeePro | below detection limit | 509.18 |
| Broodbuilder | below detection limit | 280.38 |
| FeedBee | below detection limit | 844.56 |

0.001 w % is the isofucosterol detection limit
Methods for analysis from Zu et al. 2021 *New Phyt* 230: 1169-1184
Total calculated as the sum of the quantities of bee-relevant phytosterols: 24MCHO = 24-Methylenecholesterol, CAMPE = campesterol, STIGM = stigmasterol, b-SITO = b-sitosterol, ISOFUCO = isofucosterol There is a good literature describing how to make holidic diets for experimentation with diet assays using honeybees. We refer to US2019/0090507, articles by Svoboda et al, Chakrabarti et al mentioned above for examples of different background holidic diets.

Example 1—Preference Essay: Bees Prefer Specific Concentrations of Isofucosterol in Foods Newly emerged adult worker honeybees (*Apis mellifera*) or adult worker bumblebees (*Bombus terrestris*) were tested in a two-choice preference assay in which bees had access to two diets and ad libitum access to water.

One treatment diet contained the isofucosterol and the other contained no sterol. Newly emerged bees were removed from the brood frame and cohorts of 30 bees per replicate were housed in plastic rearing cages. In all experiments, 10 cohorts of ~30 bees each were used for each treatment group. In all diets carbohydrate was maintained at 60% using sucrose and fat was maintained at 8%. Consumption of each diet was measured every 24 h for 5 days.

Preference index was calculated as (amount of treatment consumed—amount of control consumed)/(total amount of food consumed).

In Example 1, cohorts of bees were given a choice of diet with or without isofucosterol. Bees preferred to consume food that contained at least 0.05% isofucosterol in the diet, as shown in FIG. 7.

Example 2—Survival: Bees Live Longer on Foods Containing Isofucosterol

Newly emerged adult worker honeybees fed with a diet treatment and ad libitum access to water. The treatment diet contained the isofucosterol. Newly emerged bees were removed from the brood frame and cohorts of 30 bees per replicate were housed in plastic rearing cages. In all experiments, 10 cohorts of ~30 bees each were used for each treatment group. In all diet's carbohydrate was maintained at 60% using sucrose and fat was maintained at 8%. Consumption of each diet was measured every day over the course of the experiment. The number of bees alive in the box was counted each day for 14 days.

Example 2 represents the survival of cohorts of bees confined to feed on diets containing specific concentrations of isofucosterol (0%, 0.5% and 1% weight of diet), as shown in FIG. 8.

Example 3—Brood Production: Honeybees Produce More Brood with Isofucosterol and Produce Brood for Longer Periods of Time Honeybees: Fully functional insulated styrofoam Apidea nucs comprised 5 mini frames populated with adult workers and 1 mated laying queen bee were populated with 300-400 ml of young adult workers (~N<1.000 bees of mixed ages).

The colony was located in an enclosed glasshouse with ventilation which did not permit the honeybees to forage on nectar or pollen. Each treatment was tested with 3-6 colonies; each colony was fed with a 60-100 g patty (solid diet) on the top feeder fitted with a mesh floor. Diet was fed on the first day and again on day 6; the quantity consumed was measured on day 6 and day 15. If no larvae or eggs/queen are observed by day 6 then the experiment is terminated. The number of capped brood cells was counted on day 15. The number of bee seams was estimated during each inspection. Sugar syrup (34%) and water was provided in feeders inside the tent to prevent carbohydrate starvation and to stimulate foraging activity.

In Example 3, bees were fed with a diet containing 10-18% protein, 6% fat, 1% vitamins/minerals and >75% carbohydrates.

FIG. 9 exhibits the threshold of example 3 for the influence of isofucosterol in bee diet. As the concentration of isofucosterol increased, the amount of brood produced in each colony increased (N>3 colonies/treatment). The pupae, and the number of new adults was counted over the entire 10-week period.

Example 4A: Long Term Apidea Experiment with Bees Fed a Multiplicity of Sterols Including Isofucosterol and 24-Methylenecholesterol Honeybees: Fully functional insulated styrofoam Apidea nucs comprised 3-5 mini frames populated with adult workers and 1 mated laying queen bee were populated with 300-400 ml of young adult workers (~N<1 000 bees of mixed ages).

The colonies are located in an enclosed screenhouse with ventilation which did not permit the honeybees to forage on nectar or pollen. Each treatment was tested with 3-6 colonies; each colony was fed ad libitum with the solid diet on the top feeder fitted with a mesh floor, and the quantity consumed was assessed at every feeding. The number of capped brood cells was assessed every 12 days. The number of bee seams was recorded during each inspection. If the colony reaches maximal size for the Apidea box, a super is added. Sugar syrup (34%) and water was provided in feeders inside the tent to prevent carbohydrate starvation and to stimulate foraging activity.

In Example 4A, bees were fed with a diet containing 15-30% protein, 4-12% fat, 1% vitamins/minerals and >40% carbohydrates (Diet 1).

The experiments included the following treatments:

Diet 1: the above diet 1 to which no sterols are added

Figure 4:
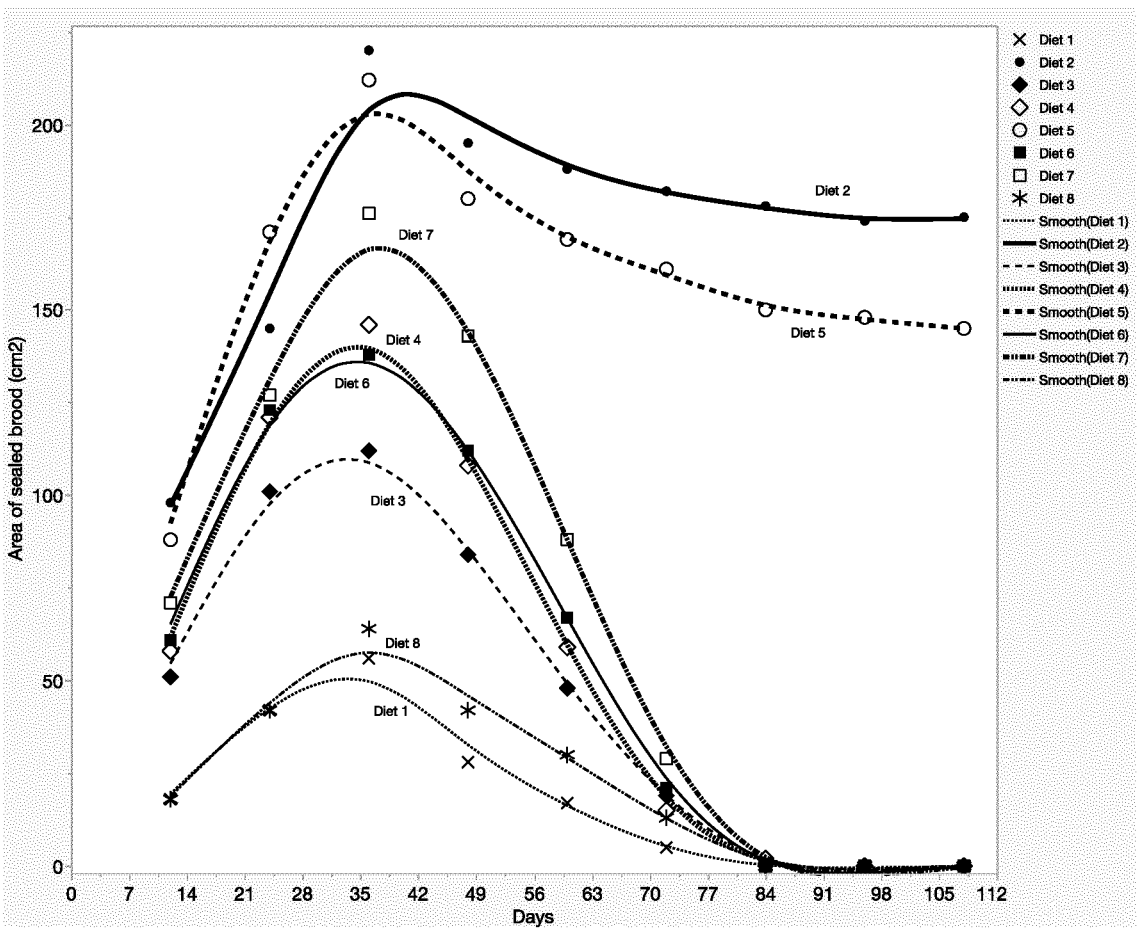
FIG. 4 shows the results of Example 4A: a long-term feeding experiment in Apidea colonies with bees fed a multiplicity of sterols including isofucosterol and 24-Methylenecholesterol.

Diet 2=Diet 1 to which isofucosterol, 24-Methylenecholesterol, campesterol, beta-sitosterol, stigmasterol, and cholesterol is added in ratios and concentrations as per preferred embodiment above Diet 3=Diet 2 but without inclusion of 24-Methylenecholesterol Diet 4=Diet 2 but without inclusion of isofucosterol Diet 5=a pollen-based patty (pollen patty) consisting of 60.5% pollen (fresh frozen honeybee collected pollen from BioBest, Antalya, Turkey), 25.2% powdered sugar, and 14.3% honey Diet 6=Diet 2 but without inclusion of cholesterol Diet 7=Diet 2 but without inclusion of beta-sitosterol, stigmasterol and campesterol DIET 8=a commonly used commercially available diet FIG. 4—results of experiment 4A: Mean area of sealed brood (cm2) assessed every 12 days over a 15-week period. Each colony was fed one diet treatment: Diet 1 (crosses, thin dotted line), Diet 2 (full circles, thick full line), Diet 3 (full diamonds, thin dashed line), Diet 4 (empty diamonds, thick dotted line), Diet 5 (open circles, thick dashed line), Diet 6 (full squares, thin full line), Diet 7 (empty squares, thick dashed and dotted line), and Diet 8 (asterisks, thin dashed and dotted line).

Example 4B: Long Term Apidea Experiment with Bees Fed a Multiplicity of Sterols without Isofucosterol, but Including 24-Methylenecholesterol Honeybees: Fully functional insulated styrofoam Apidea nucs comprised 3-5 mini frames populated with adult workers and 1 mated laying queen bee were populated with 300-400 ml of young adult workers (~N<1,000 bees of mixed ages).

The colonies are located in an enclosed screenhouse with ventilation which did not permit the honeybees to forage on nectar or pollen. Each treatment was tested with 3-6 colonies, each colony was fed ad libitum with the solid diet on the top feeder fitted with a mesh floor, and the quantity consumed was assessed at every feeding. The number of capped brood cells was assessed every 12 days. The number of bee seams was recorded during each inspection. If the colony reaches maximal size for the Apidea box, a super is added. Sugar syrup (34%) and water was provided in feeders inside the tent to prevent carbohydrate starvation and to stimulate foraging activity.

In Example 4B, bees were fed with a diet containing 15-30% protein, 4-12% fat, 1% vitamins/minerals and >40% carbohydrates (Diet 1).

The experiments included the following treatments:

Diet 1=a diet containing 15-30% protein, 5-10% fat, 1% vitamins/minerals and >40% carbohydrates, to which no sterols are added.

Diet 2=pollen patty (60.5% honeybee collected mixed pollen pellets, 25.2% powdered sugar, and 14.3% honey).

Diet 3=Diet 4 but without inclusion of 24-Methylenecholesterol.

Diet 4=Diet 1 to which 24-Methylenecholesterol, campesterol, beta-sitosterol, stigmasterol, and cholesterol are added in ratios and concentrations as per preferred embodiment above.

Diet 5=a commonly used commercially available diet.

Figure 5:
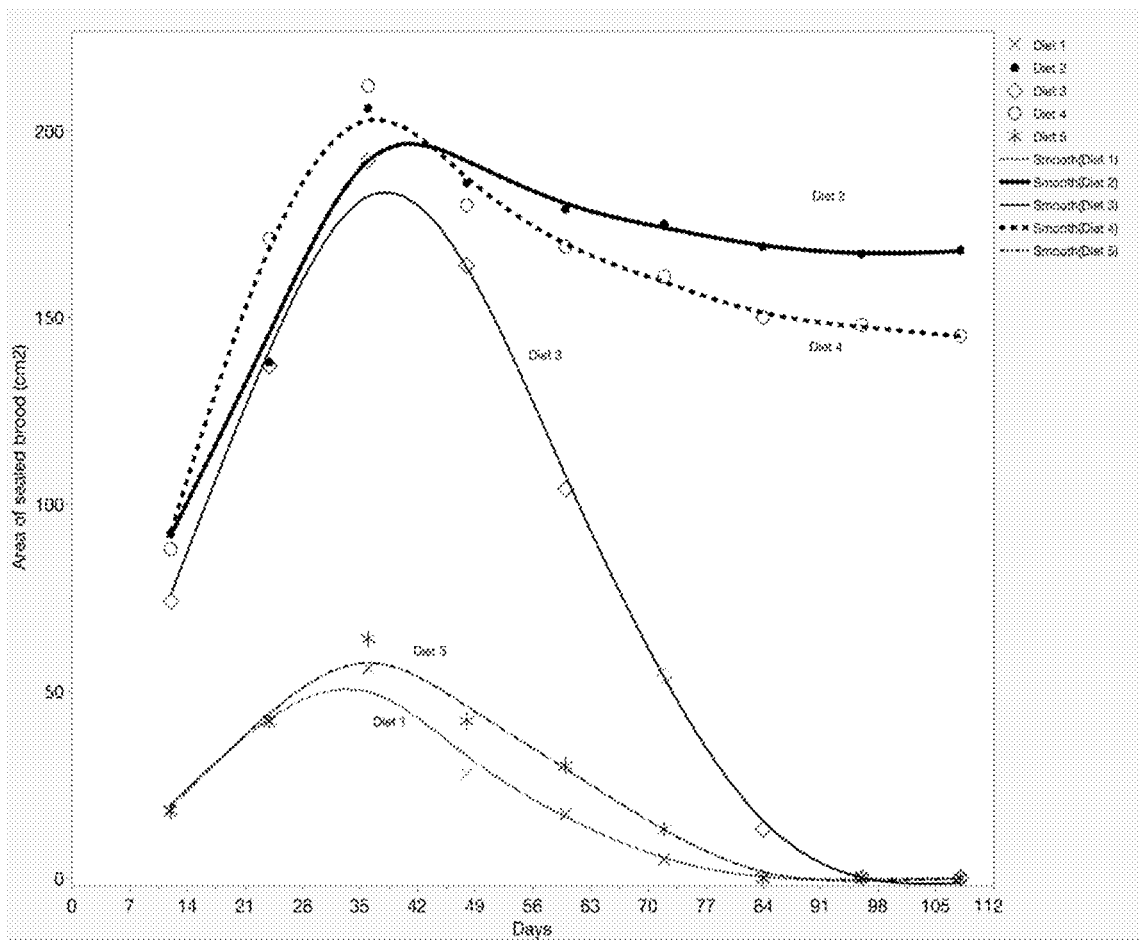
FIG. 5 shows the results of Example 4B: Results of a long-term feeding experiment in Apidea colonies with bees fed a multiplicity of sterols without isofucosterol but including 24-Methylenecholesterol.

FIG. 5 shows the result of experiment 4B: Mean area of sealed brood (cm2) assessed every 12 days over a 15-week period. Each colony was fed one diet treatment: Diet 1 (crosses, thin dotted line), Diet 2 (full circles, thick full line), Diet 3 (empty diamonds, thin line), Diet 4 (empty circles, thick dashed line), Diet 5 (asterisks, thin dashed and dotted line).

Example 4C: Long Term Apidea Experiment with Bees Fed a Multiplicity of Sterols Whereby the Total Concentration of Sterols in the Diet is Kept Constant and the Presence (Concentration) of Specific Sterols is Varied Between Diets Honeybees: Fully functional insulated styrofoam Apidea nucs comprised 3-5 mini frames populated with adult workers and 1 mated laying queen bee were populated with 300-400 ml of young adult workers (~N<1,000 bees of mixed ages).

The colonies are located in an enclosed screenhouse with ventilation which did not permit the honeybees to forage on nectar or pollen. Each treatment was tested with 3-6 colonies, each colony was fed ad libitum with the solid diet on the top feeder fitted with a mesh floor, and the quantity consumed was assessed at every feeding. The number of capped brood cells was assessed every 12 days. The number of bee seams was recorded during each inspection. If the colony reaches maximal size for the Apidea box, a super is added. Sugar syrup (34%) and water was provided in feeders inside the tent to prevent carbohydrate starvation and to stimulate foraging activity.

The experiments included the following treatments:

Diet 1=a diet containing 15-30% protein, 5-10% fat, 1% vitamins/minerals and >40% carbohydrates, to which no sterols are added.

Diet 2=Diet 1 to which 24-Methylenecholesterol and isofucosterol are added at lower concentrations than preferred embodiment above, and campesterol, beta-sitosterol, stigmasterol, and cholesterol is added in ratios and concentrations as per preferred embodiment above.

Diet 3=Diet 2 but with greater concentrations of 24-Methylenecholesterol and isofucosterol, as per preferred embodiment above, cholesterol, and lower concentrations of campesterol, beta-sitosterol and stigmasterol, to maintain similar total sterol percentage as in diet 2.

Diet 4=similar to diet 3 but without inclusion of 24-Methylenecholesterol and of cholesterol, maintaining total sterol percentage as in diet 7.

Diet 5=similar to diet 3 but without inclusion of isofucosterol.

Diet 6=similar to diet 3 but without inclusion of 24-Methylenecholesterol and of isofucosterol.

Diet 7=similar to diet 3 but without inclusion of 24-Methylenecholesterol, isofucosterol, and cholesterol, maintaining total sterol percentage as in diet 4.

Diet 8=pollen patty (60.5% honeybee collected mixed pollen pellets, 25.2% powdered sugar, and 14.3% honey).

Figure 6:
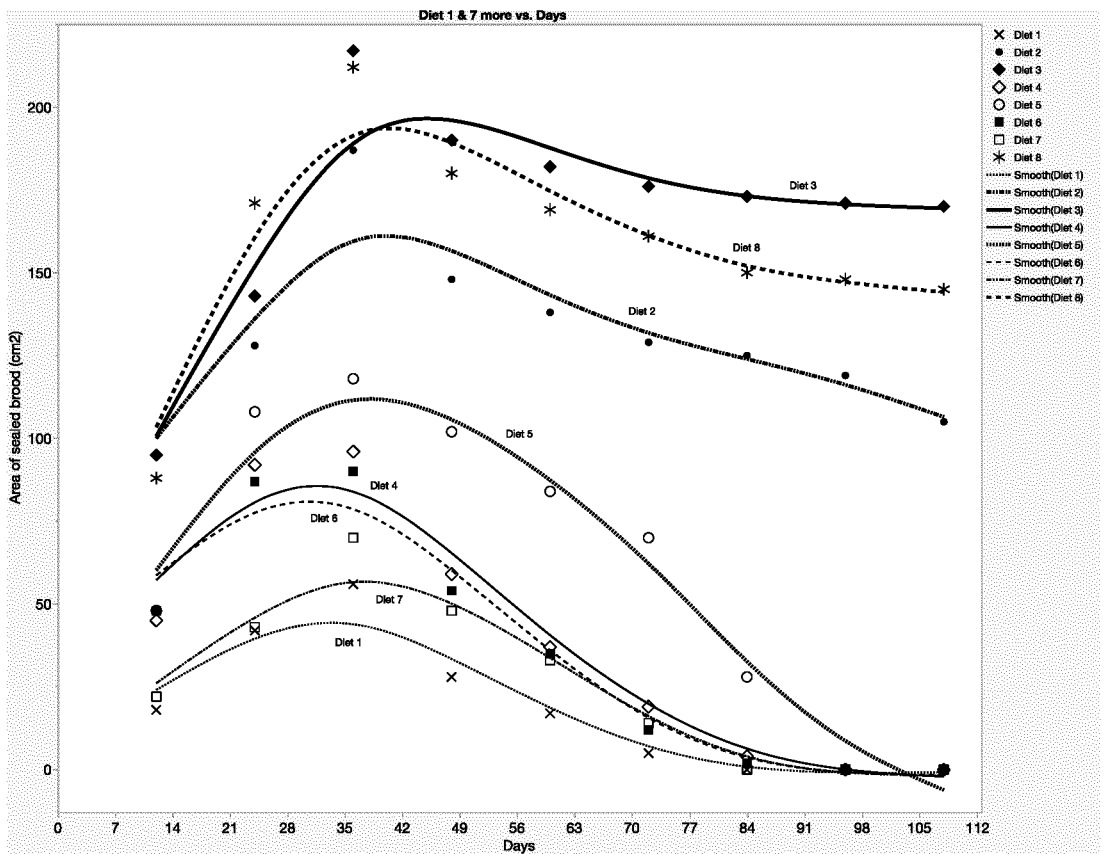
FIG. 6 shows the results of Example 4C: Results of a long-term feeding experiment in Apidea colonies with bees fed a multiplicity of sterols whereby the total concentration of sterols in the diet is kept constant and the presence (concentration) of specific sterols is varied between diets.

FIG. 6: Results of Example 4C: Results of a long-term feeding experiment in Apidea colonies with bees fed a multiplicity of sterols whereby the total concentration of sterols in the diet is kept constant and the presence (concentration) of specific sterols is varied between diets.

Example 5: Black Soldier Fly Experiments

FIG. 7 shows the results of Example 5A: Feeding adult Black soldier flies with a diet containing a multiplicity of sterols: effect on hatching rate of the eggs laid and the weight of the egg mass laid. Adult survival and number of egg masses laid from a population fed with a pollen substitute diet (as specified in US2019/0090507 to Apix Biosciences) was measured daily using the methods of rearing described in Thinn and Kainoh 2022. JARQ 56 (2), 211-217 (2022).

FIG. 8 shows the results of Example 5B: Feeding adult Black soldier flies with a diet containing a multiplicity of sterols: effect on adult longevity and larval survival to prepupae stage. Black soldier fly (BSF) larvae were fed with a diet containing 22% protein, 4% fat as described in Hogsette 1992. J. Econ. Entomol. 85(6): 2291-2294 until ecclosion. Sterols were sourced as pure compounds added directly to diet to a total quantity of 0.1%. Larvae and adult survival over a 50 day period measured as in Georgescu et al., Eur. J. Entomol. 118: 297-306, 2021.

FIG. 9 shows the results of Example 5C: Feeding adult Black soldier flies with different diets containing a multiplicity of sterols: sterols found in in the tissues of black soldier flies fed with a multiplicity of sterols. Sterols were added to diet. Measurement of sterols in tissues was performed after saponification of BSF tissues using GC-MS as described in Boukid et al. 2022. Insects 12, 672.

Example 6: Black Soldier Fly Experiments

Changing the nutritional composition of a BFS larva for a target species (honeybee) by incorporating a multiplicity of sterols in the diet of the BFS larvae, making an feed formulation containing larvae and feeding those larvae the target species. Black soldier fly larvae were fed with a diet as in FIG. 10. Sterols needed by honeybees were added to diet in quantities specified as in Diet 2 or as single sterols (24-Methylenecholesterol, 24MC or isofucosterol). One group did not have sterol added directly to the diet. Extracts were made using hexane from freeze-dried BSF larvae. The hexane solvent containing the fat fraction was added to the diet; the hexane was allowed to evaporate before the diet was used to feed the larvae.

This example generally shows how by feeding a multiplicity of sterols adapted to meet the needs of a target species can benefit the performance of the target species. Since BFS grown on different waste streams does not contain optimal sterol profiles for algae or plankton eating cultured fish, crustacea and cultured marine invertebrates and their larvae, this method of adding fucosterol or isofucosterol, 24-Methylenecholesterol (all enriched in algae but absent in current non algal artificial diets for above species diets) to BFS diets and then feeing lipid or protein or total extracts of these BFS larvae to algae eating aquaculture organisms is a method to improve the performance of aquaculture artificial diets for organism normally feeding on plankton and larvae and requiring isofucosterol/fucosterol and/or 24-Methylenecholesterol.

FIG. 10 shows the results of Example 6: Feeding honeybee colonies in an Apidea experiment with a diet containing an extract of Black soldier flies that were fed a multiplicity of sterols.

Example 7: Development of a Complete Diet for Honeybees: Importance of Isofucosterol and a Multiplicity of Sterols In the following embodiment we set out to test whether removal of a single phytosterol or a pair of phytosterols from a pollen-free diet containing a multiplicity of added sterols is affecting the long-term brood production of a hive fed exclusively on this diet.

Thereto we set up an assay wherein beehives are fully contained in a large tent (FIG. 11A to 11D) and have no access to external food and are fed pollen-free diets with differing sterol compositions but an identical total sterol concentration that is similar to that found in pollen and honeybees:

Three diets were prepared:

Diet A: A pollen-free honeybee diet containing proteins, lipids, minerals, vitamins and antioxidants and a trace of sterols but no added sterols. This research diet was formulated by APIX Biosciences NV Belgium using industrially available ingredients as a patty that can be placed on top of bee frames in a hive, as is standard for "protein supplements" in the industry (PCT/GB2016/053573). This diet is similar to the diet used by Herbert et al and others except that is more complete and more balanced in its nutrients and has a superior nutritional base. In this diet we mixed in (dissolved in lipids) 0.375% added sterols [24-methylene-cholesterol (0.125%), isofucosterol/fucosterol isomers (0.0625%) and 0.1875% of a mixture of sterols [including Beta-sitosterol, campesterol, stigmasterol (no isofucosterol and no 24-methylene-cholesterol) typically found in pollen sourced by honeybees] resulting in concentrations and ratios of phytosterols that reflect on average the natural composition of pollen. Semi-synthetic 24-methylene-cholesterol (97% pure) and semi-synthetic isofucosterol (97% purity; 75% isofucosterol and 25% its E-Z isomer fucosterol; hereafter named interchangeably "isofucostero/fucosterol" or "isofucosterol") were procured from Phytant NV Belgium. The background diet of diet A is a proprietary diet (developed by APIX Biosciences NV, Belgium) formulated with registered animal feed ingredients and pollen-free (PCT/GB2016/053573).

Diet B: a pollen-free and isofucosterol/fucosterol-free diet. This is diet A from which the 0.0625% added isofucosterol/fucosterol mix was omitted. To maintain the total added sterol concentration in the diet constant, the concentration of the other added sterols in the diet was proportionally increased to the total sterol concentration of diet A 0.375% added sterols. This increases the concentration of the other individual added sterols with a factor 1.2 and this results in a concentration of these sterols within the middle of the ranges present in pollen on which honeybees feed successfully.

Diet C: a pollen-free and 24-methylene-cholesterol-free diet. This is diet A from which the 0.125% added 24-methylene-cholesterol was omitted. To maintain the total added sterol concentration in the diet constant, the concentration of the other sterols present in the diet was proportionally increased to the total sterol concentration of diet A 0.375% added sterols. This results in a concentration of the other added sterols within the middle of the ranges present in pollen on which honeybees feed successfully.

We assessed the ability of these 3 diets and a fourth commercial diet that is widely used in the United States (Diet E, see FIG. 20 and example 8) to sustain brood production in a hive for 96 days (>4 nurse bee generations) when fed as sole source of nutrients (other than sugar syrup and water provided in the tent through a sugar feeder and water feeder). Six small hives per diet populated by 800-850 ml (approximately 2000 bees) and a queen each were distributed over adjacent tent enclosures of 2 m×4.5 m×3 m each (3 hives per tent; FIG. 11). The tented enclosures are in Wingene, Belgium (Day 0=May 23$^{rd}$). On day 0 only traces of pollen and bee bread were present in the hives. The queens were freshly mated sister queens of identical age and genetic background (*Apis mellifera ligustica*).

The feed was provided to each hive every 6 days by laying a patty on top of the frames (above the brood nest) as per standard beekeeping practice (FIG. 11). All three hives in the same tent received the same diet (two tents per diet). The bees had ad libitum access to water and 400 ml of 50% sucrose sugar syrup per 6 days placed on a table in the tent (sugar was not provided ad libitum to avoid filling all cells with syrup thus limiting the space available for brood) (FIG. 11C). Food consumption was measured every 6 days by weighing the uneaten patties of each hive and replacing them with fresh patties. Photographs were taken of each frame that contained brood of every hive every 12 days for a period of 96 days (FIG. 11D). The capped brood was manually counted on each photograph (FIGS. 15, 16 and 17) by two to three different individuals and the results reverified (Quality Assurance checked) by another individual. Hives wherein the queen stopped laying in the first 24 days (period of stabilization of the hive) and hives where the queen was crushed accidentally during observations were removed from the experiment. This observation regime assures that all bees born in the hive (all brood that developed to capped brood) was photographed at least once and only once. On day 84 a sample of 25-30 bees was taken from each hive for future study.

This design is similar to the experiments of Herbert et al. (Ref) wherein a series of single phytosterols (but not isofucosterol) were incorporated in a simple holidic diet and small hives maintained on the diets until no more eggs were produced. However, in our experimental design we added a defined multiplicity of sterols, used a more complex and complete background diet, and assessed the effect of omitting a single sterol from the diet while keeping the total sterol concentration constant.

Our experiments were run for 96 days (4.5 brood-cycles of 21 days on artificial diet). It takes about 24 days or 1.5 life cycles of nurse bees to deplete the food stored in the hives and any pools of nutrients stored in the bees that were present at the start of the experiment. All capped brood observed on day 24 comes from eggs laid inside the tent and are thus expected to be fully fed with the artificial diet. Capped brood observed from day 36 onwards is expected to be fully fed by nurse-bees that themselves were raised on the artificial diet. The same applies to nutrients fed by the nurse-bees to the queen.

The Importance of Isofucosterol/Fucosterol

The bees and hives showed a normal behavior in the tent as shown by a normal diurnal cycle of flying and returning to the hives at dusk or in case of rain, collection of sugar syrup and water by foragers, orientation, and defecation flights. However, in these conditions the hives experience significant stresses: (1) being enclosed in the hive and flying against the netting (2) more importantly, the hives were opened, and all frames removed for photography every 12 days, a procedure exposing the brood to cold temperatures and disturbing the hive substantially. The latter procedure will have had a significant negative impact on the health and productivity of the hives. Another element to consider is that we started with freshly established small hives (800-850 ml bees and a newly mated queen). Small hives are more sensitive to being disturbed and can heat/cool themselves less well than larger colonies of e.g., 4000 bees. During a heat wave we lowered the temperature in the tents by nebulizing water from a single nozzle maintaining the temperature to 37.5 C max.

Despite these stresses we were able to maintain the hives fed exclusively on the pollen-free diet A and sugar solution in good health and producing brood stably for more than 96 days in the tented enclosures. Hives fed a commercial protein patty show a steep brood decline after 36 days (Diet E, FIG. 20).

To date no artificial pollen free complete diet for honeybees has been reported.

The results are presented in FIG. 12 to 20 and Tables 2 to 4, listed below.

TABLE 3

Capped brood as measured in each hive at each timepoint (day 0 = start of placement of hives in tented enclosures and start of feeding the diets).

| Capped Brood Count | Hive # | D 24 | D 36 | D 48 | D 60 | D 72 | D 84 | D 96 |
|---|---|---|---|---|---|---|---|---|
| Diet A | 4 | 443 | 849 | 430 | 215 | 172 | 339 | 399 |
| | 29 | 236 | 384 | 342 | 255 | 268 | 361 | 178 |
| | 40 | 427 | 276 | 375 | 508 | 483 | 525 | 576 |
| | 56 | 400 | 578 | 465 | 406 | 359 | 204 | 213 |
| | 57 | 93 | 137 | 210 | 153 | 173 | 180 | 151 |
| Average Diet A | | 320 | 445 | 364 | 307 | 291 | 322 | 303 |
| Diet B | 12 | 484 | 146 | 412 | 349 | 364 | 394 | 353 |
| | 15 | 160 | 22 | 12 | 197 | 3 | 0 | 0 |
| | 26 | 280 | 157 | 74 | 123 | 98 | 78 | 130 |
| | 28 | 38 | 308 | 53 | 292 | 104 | 12 | 102 |
| | 50 | 61 | 22 | 0 | 72 | 56 | 0 | 2 |
| | 51 | 292 | 60 | 22 | 5 | 4 | 0 | 0 |
| Average Diet B | | 219 | 119 | 96 | 173 | 105 | 81 | 98 |
| Diet C | 14 | 271 | 503 | 254 | 186 | 93 | 190 | 228 |
| | 30 | 307 | 528 | 125 | 215 | 135 | 85 | 51 |
| | 34 | 459 | 223 | 364 | 396 | 336 | 219 | 148 |
| | 41 | 252 | 480 | 253 | 328 | 328 | 328 | 243 |
| Average Diet C | | 322 | 434 | 249 | 281 | 223 | 206 | 168 |

TABLE 2A

Summary of the averages shown in tables 3

| Brood Count | | D 24 | D 36 | D 48 | D 60 | D 72 | D 84 | D 96 |
|---|---|---|---|---|---|---|---|---|
| Diet A containing all sterols | Avg Diet A | 320 | 445 | 364 | 307 | 291 | 322 | 303 |
| Diet B = Diet A minus isofucosterol - fucosterol | Avg Diet B | 219 | 119 | 96 | 173 | 105 | 81 | 98 |
| Diet C = Diet A minus 24-Methylene-cholesterol | Avg Diet C | 322 | 434 | 249 | 281 | 223 | 206 | 168 |

TABLE 2B

Summary of the averages shown in tables 4

| Cumulative Brood Count | | D 24 | D 36 | D 48 | D 60 | D 72 | D 84 | D 96 |
|---|---|---|---|---|---|---|---|---|
| Diet A containing all sterols | Avg Diet A | 320 | 765 | 1129 | 1436 | 1727 | 2049 | 2353 |
| Diet B = Diet A minus isofucosterol - fucosterol | Avg Diet B | 219 | 338 | 434 | 607 | 712 | 792 | 890 |
| Diet C = Diet A minus 24-Methylene-cholesterol | Avg Diet C | 322 | 756 | 1005 | 1286 | 1509 | 1715 | 1882 |

TABLE 4

Cumulative capped brood fully fed on the diet as measured in each
hive starting at timepoint day 24 (day 0 = start of placement
of hives in tented enclosures and start of feeding the diets).

| Cumulative Brood Count | Hive # | D 24 | D 36 | D 48 | D 60 | D 72 | D 84 | D 96 |
|---|---|---|---|---|---|---|---|---|
| Diet A | 4 | 443 | 1292 | 1722 | 1937 | 2109 | 2448 | 2847 |
| | 29 | 236 | 620 | 962 | 1217 | 1485 | 1846 | 2024 |
| | 40 | 427 | 703 | 1078 | 1586 | 2069 | 2594 | 3170 |
| | 56 | 400 | 978 | 1443 | 1849 | 2208 | 2412 | 2625 |
| | 57 | 93 | 230 | 440 | 593 | 766 | 946 | 1097 |
| | Avg diet A | 320 | 765 | 1129 | 1436 | 1727 | 2049 | 2353 |
| Diet B | 12 | 484 | 630 | 1042 | 1391 | 1755 | 2149 | 2502 |
| | 15 | 160 | 182 | 194 | 391 | 394 | 394 | 394 |
| | 26 | 280 | 437 | 511 | 634 | 732 | 810 | 940 |
| | 28 | 38 | 346 | 399 | 691 | 795 | 807 | 909 |
| | 50 | 61 | 83 | 83 | 155 | 211 | 211 | 213 |
| | 51 | 292 | 352 | 374 | 379 | 383 | 383 | 383 |
| | Avg diet B | 219 | 338 | 434 | 607 | 712 | 792 | 890 |
| Diet C | 14 | 271 | 774 | 1028 | 1214 | 1307 | 1497 | 1725 |
| | 30 | 307 | 835 | 960 | 1175 | 1310 | 1395 | 1446 |
| | 34 | 459 | 682 | 1046 | 1442 | 1778 | 1997 | 2145 |
| | 41 | 252 | 732 | 985 | 1313 | 1641 | 1969 | 2212 |
| | Avg diet C | 322 | 756 | 1005 | 1286 | 1509 | 1715 | 1882 |

FIG. 12 and tables 2, 3, 4 show that on average a hive fed diet A produce 2353 capped brood between day 12 and 96 versus 890 capped brood in the same period on average for hives fed diet B. FIG. 12 also shows that after day 60 the amount of brood produced in all but 1 hive fed diet B (Hive #12) decreases while all hives fed diet A show a linear growth increase. Three out of five hives fed diet B stopped having capped brood by day 84 while all hives fed diet A continued producing brood. This demonstrates that the omission of isofucosterol-fucosterol from diet A severely affects the ability of a hive of honeybees to produce brood and that the other sterols cannot compensate for this deficiency. Brood production is an essential function for a hive's survival.

Tables 2 and 3 and FIGS. 12, 14, 15, 16 and 17 show that on diet A the amount of brood at each timepoint is stable (FIG. 14A) while on diet B the amount of brood produced at each time-point is lower than diet A. We conclude that on diet A the hives are stable under the conditions tested for 96 days or 4.5 generations of nurse bees (despite the severe stresses described above). The hives clearly are less performant in brood production and less stable when the 0.0625% isofucosterol-fucosterol is omitted from the diet and replaced by proportionally increasing the concentration of each of the other added sterols.

FIG. 13 shows the consumption of diets A and B. Since the primary use of pollen in a hive is to feed nurse bees which then feed larvae and the queen it is logical that if fewer brood is produced, less of the diets will be consumed (FIG. 13).

The photographs of the frames with brood clearly illustrate the difference in the number and pattern of the capped brood in an average diet A fed hive #29 (FIG. 15), and an average diet B fed hive #26 (FIG. 16).

FIG. 17 shows that hives fed diet A consistently produce more brood than those fed diet B.

We conclude that the addition of isofucosterol-fucosterol to an incomplete diet that contains cholesterol, campesterol, Beta-sitosterol, stigmasterol and 24-methylene-cholesterol in concentrations similar to pollen but no isofucosterol-fucosterol, results in a diet that sustains a hive over 4.5 brood-cycles (generations) of nurse bees (without access to pollen or other nutrients (except sugar solution)). Worded in reverse, the embodiment shows that omission of isofucosterol-fucosterol from a complete diet severely reduces the fitness of the hive and honeybees and that the proportional compensation of this isofucosterol-fucosterol omission with the other sterols does not compensate for this omission.

This is a first and clear demonstration that isofucosterol-fucosterol is functionally important and essential in a honeybee's hive's diet. The data shows that isofucosterol-fucosterol is required for brood production in honeybees despite the presence of all other major sterol present in pollen and honeybees and that its physiological role cannot be assumed by the other sterols (cholesterol, 24-methylene-cholesterol, campesterol, stigmasterol, Beta-sitosterol that normally represent >80% of the overall sterols present in honeybees—the remainder being isofucosterol-fucosterol) present in the diet. Diet A is also the first reported complete artificial diet for honeybees that is pollen-free.

The Importance of 24-Methylene-Cholesterol

Hives fed on diet C=diet A from which 24-methylene-cholesterol was omitted started to show an increasing difference in the amount produced from day 48 onwards (FIGS. 18 and 19, Tables 2, 3 and 4). Between day 36 to day 96, the hives fed diet C produced 1126 cumulative capped brood on average versus 1588 cumulative capped brood on average for hives fed diet A. We note that the difference in capped brood produced in diet A versus diet B (minus isofucosterol-fucosterol) is already apparent on day 24-36 (Table 2, Table 3). The later appearance of a phenotype due to the omission of 24-methylene-cholesterol as observed with diet C compared to effect of the omission of isofucosterol in diet B can be explained by the observations of Sbovoda et al. (Table 7) that honeybees have a mechanism to recycle a pool of 24-methylene-cholesterol in a hive to brood and nurse bees thereby retaining (some of) the pool in the hive. The data reported in this embodiment further stress the increased importance of isofucosterol-fucosterol in an artificial honeybee diet versus 24-methylene-cholesterol since the effect of its omission manifests itself earlier.

This data is the first technical demonstration that 24-methylene-cholesterol is functionally required in a honeybee's diet and that its physiological function cannot be fully compensated by the presence of the other sterols (cholesterol, isofucosterol/fucosterol, beta-sitosterol, campesterol, stigmasterol) present in the diet and at concentrations and ratios normally present in pollen.

Example 8: Behavioral Phenotypes of Isofucosterol/Fucosterol and 24-Methylene-Cholesterol Deficiencies The number of bees and nurse bees in a hive is important but the quality, physiological fitness of the bees is equally critical to a hive's fitness and ability to pollinate crops.

Honeybees need to execute complex behavior functions in the hive (cleaning, feeding brood, building cells, guarding, ventilating, heating . . . ) and outside of the hive (flying long distances—up to 2 km from the hive, finding the way back home, signaling the location of food sources to nest mates, collecting nectar, pollen, minerals, water, propolis . . . ). The number of bees in a hive and their longevity determines how many resources the hives can collect to sustain and grow the hive. From a commercial perspective larger more active and well-fed hives (with longer living foragers that are more fit) pollinate crops better and can sustain exposure to pesticides and other stressors (heat, transport, disease) better. In summary, not only the quantity of bees in a hive but also their quality is important.

Different sterols are known to differently affect the membrane structures in cells. One of the roles of sterols in the membranes of animal cells is to regulate fluidity of the membranes and the organization of proteins in rafts in the membranes which is important for the proper functioning of amongst other cell muscles and neurons, the formation of membrane curvature and vesicles and the adaptation to different environmental temperatures.

In this embodiment we examine whether hives in tented enclosures fed on different diets differing only in sterol composition produce honeybees of equal behavioral fitness.

We characterized the behavior and activity of the honeybees fed with the following diets in the same tent setup following the same protocols as described above (see FIG. 11):

1. Hives outside: These hives started at the same as the hives in the tents with sister queens and the same number of honeybees but were placed outside adjacent to the tents with full access to pollen flow and nectar from nature.

2. Hives in tents—Diet A: Diet A see above (same hives and timepoints as Example 7). Diet A'=diet A with double the concentration of added sterols (0.75%) in the same composition and ratios as Diet A. Diet A and A' have identical phenotypes.

3. Hives in tents—Diet B: Diet A minus isofucosterol/fucosterol (concentration of other added sterols proportionally adjusted upwards as described above; same hives and timepoints as embodiment 1)

4. Hives in tents—Diet C: Diet A minus 24-methylene-cholesterol (concentration of other added sterols proportionally adjusted upwards as described above; same hives and timepoints as embodiment 1)

5. Hives in tents—Diet D: Diet A lacking isofucosterol/fucosterol and 24-methylene-cholesterol (concentration of other added sterols adjusted upwards to the concentration of diet A' (0.75%); run in parallel tents at the timepoints as embodiment 1; same overall protocol of feeding and hive assessment)

6. Hives in tents—Diet E: Commercially available diet (completely different diet; run in parallel tents at the timepoints as embodiment 1; same overall protocol of feeding and hive disturbance) Hives fed diet E (commercial diet) essentially stopped producing brood after 36 (table 5, FIG. 20). Hives fed diet A, B, C and D were still producing brood at day 96. The diets and experimental design are described in example 7.

On day 98-99, the hives were opened and scored visually for several phenotypes (scores: phenotype absent (−), phenotype present (+), phenotype more severe (++), phenotype is even more severe (+++)).

They were scored independently by 2 observers for the following phenotypes:

Lethargic: Bees sitting immobile on hives.

Shaking, Uncoordinated: bees walking with trailing back legs, walking unsteadily, wings less promptly placed from open to folded position (indications of uncoordinated neuromuscular activity)

Weak reaction—not flying up: Bees on a frame responding slowly to being disturbed by a removal of the frame from the hive or trailing a pair of tweezers through the bees on a frame, bees crawling more slowly upwards after being pushed from a frame, failure to fly off when disturbed.

Slow movement: Bees walking more slowly than normal on the frames and/or around the sugar feeder, and/or the nest entrance Responsiveness: This an integrated score from 1-5 (low to high) representing the overall hive activity and vigor of the honeybees in and outside of the hive The results of these observations are presented in Tables 5 and 6.

TABLE 5

| DIET | Lethargic | Shaking, uncoordinate | Weak reaction, Not flying up | Slow movement | Responsiveness |
|---|---|---|---|---|---|
| Hives outside next to tents - collecting pollen | − | − | − | − | 5 |
| Diets A (0.375% sterols; all sterols) and Diet A' (0.750%; all sterols) - in tent | − | − | − | − | 5 |
| Diet C (Diet A minus 24-methylene-cholesterol) - in tent | − | − | − | + | 3 |

Phenotypic analysis after 98 and 99 days on different diets in enclosed tents and outside conditions.

TABLE 5-continued

Phenotypic analysis after 98 and 99 days on different
diets in enclosed tents and outside conditions.

| DIET | Lethargic | Shaking, uncoordinate | Weak reaction, Not flying up | Slow movement | Responsiveness |
|---|---|---|---|---|---|
| Diet B (Diet A minus isofucosterol/fucosterol) - in tent | ++ | + | ++ | ++ | 2 |
| Diet D (Diet A minus 24 methylene-cholesterol and minus-isofucosterol; 0.75% sterol concentration) - in tent | – | +++ | ++ | ++ | 3 |
| Diet E: Commercially available patty - in tent | +++ | – | +++ | +++ | 1 |

Phenotype absent –
Phenotype present +
Phenotype more severe ++
Phenotype is very severe +++

TABLE 6

Upper table: Average capped brood present at each timepoint
from day 24 to 96 for diets A, B, C and E (a commercial
diet widely in the United States). Lower table: Capped
brood counts for hives fed Diet E

| Capped Brood Count | D 24 | D 36 | D 48 | D 60 | D 72 | D 84 | D 96 |
|---|---|---|---|---|---|---|---|
| Average Diet A | 320 | 445 | 364 | 307 | 291 | 322 | 303 |
| Average Diet B | 219 | 119 | 96 | 173 | 105 | 81 | 98 |
| Average Diet C | 322 | 434 | 249 | 281 | 223 | 206 | 168 |
| Average Diet E | 255 | 244 | 77 | 69 | 16 | 0 | 0 |

| Capped Brood Count | Hive number | D 24 | D 36 | D 48 | D 60 | D 72 | D 84 | D 96 |
|---|---|---|---|---|---|---|---|---|
| Diet E | 9 | 199 | 229 | 52 | 41 | 9 | 0 | 0 |
| | 13 | 245 | 287 | 54 | 88 | 33 | 1 | 0 |
| | 37 | 364 | 174 | 108 | 86 | 34 | 0 | 0 |
| | 44 | 344 | 258 | 54 | 109 | 4 | 0 | 0 |
| | 55 | 124 | 270 | 116 | 19 | 0 | 0 | 0 |
| Average | | 255 | 244 | 77 | 69 | 16 | 0 | 0 |

Bees on diet A and A' were equally active, responsive, and mobile as bees from hives collecting food in nature placed next to the tented enclosures.

The hives fed diet C (diet A minus the 24-methylene-cholesterol) showed the slow movement phenotype (+) and had reduced a responsiveness score of 3.

The hives fed diet B (diet A minus the isofucosterol/fucosterol) exhibited lethargic (++), Shaking/uncoordinated (++); weak reaction/not flying up (++) and slow movement (++) phenotypes and had a reduced responsiveness score of 2.

The hives fed diet D (Diet A' minus the 24 methylene-cholesterol and minus-isofucosterol) exhibited strikingly more the shaking/uncoordinated (+++) phenotype than Diet B but no lethargic phenotype. Because of the absence of the lethargic phenotype in Diet D, hives fed Diet D received a responsiveness score 3. The weak reaction/not flying up (++) and slow movement phenotypes (++) phenotypes were similar in hives fed diet B and D but clearly different from Diet C.

We conclude that the omission of isofucosterol/fucosterol, or 24-methylene-cholesterol, from diet A that contains the major sterols present in honeybees (cholesterol, 24-methylene-cholesterol, beta-sitosterol, campesterol stigmasterol, isofucosterol/fucosterol) results not only in less capped brood produced (embodiment 1) but also results in honeybees that exhibit a number of phenotypes that are likely to affect their physiological fitness to execute complex hive tasks efficiently.

It shows furthermore that the phenotypes due to the absence of isofucosterol-fucosterol or of 24-methylene-cholesterol or of both these sterols cannot be physiologically compensated by an increase in the other sterols. It furthermore shows that removing both isofucosterol and 24-methylene cholesterol has a more severe effect neuromuscular (uncoordinated) than omitting one of these sterols at a time from diet A', which impacts their fitness.

The observation that the effect of removing isofucosterol/fucosterol from diet A is more severe than the effect of removing 24-methylene-cholesterol, is a surprising finding for the field, since 24-methylene-cholesterol is widely claimed in the field to be "the critical and essential phytosterol in honeybees reviewed in "Sterol and Lipid metabolism in bees" Furse et al 2023, https://doi.org/10.1007/s11306-023-02039-1).

The data examples 7 and 8 show that honeybees require a multiplicity of sterols since both isofucosterol and 24-methylene-cholesterol omitted singly or in combination cannot be functionally replaced in the honeybee's physiology by other sterols present in pollen.

We conclude that diet A is a complete diet not only from the perspective of sustaining brood production in a hive but also from a perspective of producing quality bees. We furthermore conclude that isofucosterol/fucosterol is essential in this diet and that it cannot be replaced by proportionally increasing the key other phytosterols present in pollen. The same was shown for 24-methylene-cholesterol but to a lesser extent. FIG. 20 and Table 5 show the superior performance of the complete diet A compared with a commercially available protein patty widely used in the United States.

Table 7: List of Literature References
Chakrabarti et al.
   doi:10.3390/molecules25030571
Herbert and Svoboda Group
   doi:10.1007/BF02534310
   doi:10.1016/0022-1910(80)90135-3
   doi:10.1016/0022-1910(80)90136-5 doi:10.1016/0020-1790(86)90024-7
doi:10.1007/BF02535107
Feldlaufer
doi.org/10.1002/arch.940030502
Furse S et al
doi:10.1007/s11306-023-02039-1
Tian et al
doi:10.1038/s41467-018-05619-1

The invention claimed is:

1. A method for feeding invertebrates or aquaculture organisms comprising:

providing a pollen substitute composition comprising a nutritionally effective amount of isofucosterol, fucosterol or a mixture thereof; and administering the pollen substitute composition to invertebrates or aquacultural organisms;

wherein the pollen substitute composition comprises a nutritionally effective amount selected from (a) or (b), and wherein (a) and (b) are:

(a) at least one further sterol selected from the group consisting of cholesterol, 24-Methylenecholesterol, campesterol, stigmasterol and beta-sitosterol or a physiologically available conjugate thereof, in a weight-ratio of isofucosterol, fucosterol, or a mixture thereof to the sum of at least one further sterol is from 2:100 to 100:2 and (b) at least two further sterols, selected from the group consisting of cholesterol, 24-Methylenecholesterol, campesterol, stigmasterol and beta-sitosterol or a physiologically available conjugate thereof in a weight-ratio of isofucosterol, fucosterol, or a mixture thereof to the sum of the at least two further sterols is from 2:100 to 100:2 each as compared to the total weight of the pollen substitute composition.

2. The method of claim 1, wherein the nutritionally effective amount of isofucosterol, fucosterol or a mixture thereof is a daily dose of 0.0006 w % to 0.052 w % of the life bodyweight of the invertebrates or aquaculture organisms.

3. The method of claim 1, wherein the nutritionally effective amount of isofucosterol, fucosterol or a mixture thereof is from 10 w % to 60 w % of the total amount of sterols of the group of isofucosterol, fucosterol, cholesterol, 24-Methylenecholesterol, campesterol, stigmasterol and beta-sitosterol in the total diet of the invertebrates or aquaculture organisms or the pollen substitute composition.

4. The method of claim 1, wherein the isofucosterol, fucosterol or a mixture thereof is administered in a ratio of 0.14 g to 12 g of isofucosterol, fucosterol or a mixture thereof per 30000 bees per period of two weeks.

5. The method of claim 4, wherein the isofucosterol, fucosterol or a mixture thereof is administered in an amount from 10 w % to 60 w % of the total amount of sterols of the group of isofucosterol, fucosterol, cholesterol, 24-Methylenecholesterol, campesterol, stigmasterol and beta-sitosterol in the total diet of the invertebrates or aquaculture organisms or the pollen substitute composition.

6. The method of claim 1, wherein the nutritionally effective amount of isofucosterol, fucosterol or a mixture thereof and the at least one further sterol is an administration ratio of 0.2 g to 48 grams per 30000 bees per a time period of two weeks, and wherein the isofucosterol, fucosterol or a mixture thereof is administered in an amount from 10 w % to 60 w % of the total amount of sterols of the group of isofucosterol, fucosterol, cholesterol, 24-Methylenecholesterol, campesterol, stigmasterol and beta-sitosterol in the total diet of bees or of the pollen substitute composition.

7. The method of claim 1, wherein the isofucosterol, fucosterol or a mixture thereof is administered in a ratio of 0.4 g to 36 g per 30000 bees per a time period of two weeks, and wherein the isofucosterol, fucosterol or a mixture thereof and the at least one further sterol is administered in an amount from 10 w % to 60 w % of the total amount of sterols of the group of isofucosterol, fucosterol, cholesterol, 24-Methylenecholesterol, campesterol, stigmasterol and beta-sitosterol in the total diet of bees or of the pollen substitute composition.

8. The method of claim 1, wherein the isofucosterol, fucosterol or a mixture thereof and the at least one further sterol is administered in a ratio of 0.6 g to 20 g per 30000 bees per a time period of two weeks, and wherein the isofucosterol, fucosterol or a mixture thereof is administered in an amount from 10 w % to 60 w % of the total amount of sterols of the group of isofucosterol, fucosterol, cholesterol, 24-Methylenecholesterol, campesterol, stigmasterol and beta-sitosterol in the total diet of bees or of the pollen substitute composition.

9. The method of claim 1, wherein the isofucosterol, fucosterol, cholesterol, 24-Methylenecholesterol, beta-sitosterol, stigmasterol, and/or campesterol, are administered in an amount of 0.001 w % to 0.087 w % of the life weight of the invertebrates or aquaculture organisms per day.

10. The method of claim 1, wherein the nutritionally effective amount of:

isofucosterol, if present, is in an amount of 10 w % to 60 w %, cholesterol, if present, is in an amount of 0 w % to 50 w %, 24-Methylenecholesterol, if present, is in an amount of 0 w % to 50 w %, beta-sitosterol, stigmasterol and/or campesterol, if present, is in an amount of 0 w % to 50 w % each as compared to the total amount of isofucosterol, fucosterol, cholesterol, 24-Methylenecholesterol, beta-sitosterol stigmasterol and/or campesterol.

11. The method of claim 1, wherein the composition is (c), (d) or (e) wherein (c) is a whole invertebrate diet, (d) is a part of an invertebrate diet and (e) is a dietary supplement and wherein the ratio of 24-Methylenecholesterol to the further sterol or to the combination of further sterols is from 10:1 to 1:1.

12. The method of claim 1, wherein the composition is administered to (c) or (d) wherein (c) is invertebrates of the Apidae families, and (d) is honey bees (Apini), bumble bees (Bombini) or stingless honey bees (Meliponini).

13. The method of claim 1, wherein the composition is administered in solid form such as a patty or in liquid form such as a solution or spray;

inside or outside the hive.

14. The method of claim 1, wherein a. the source of the isofucosterol, fucosterol or a mixture thereof is a pollen substitute tissue of one or more plant species selected from the group consisting of leaves, stems, roots, tubers, flowers, seeds, barks, fruits and combinations thereof; and/or b. the source of the further sterol is selected from the group consisting of cholesterol, 24-Methylenecholesterol, campesterol, and beta-sitosterol, and stigmasterol in particular the cholesterol is a pollen substitute tissue of one or more plant species selected from the group consisting of leaves, stems, roots, tubers, flowers, seeds, barks, fruits and combinations thereof.

15. The method of claim 1, wherein the source of the isofucosterol, fucosterol or a mixture thereof or the source of the at least one further sterol selected from the group consisting of cholesterol, 24-Methylenecholesterol, campesterol, and beta-sitosterol and stigmasterol is an extract, an oil, or a refinement of a non-pollen tissue of one or more of a plant species or a combination thereof.

16. The method of claim 1, wherein the source of the isofucosterol, fucosterol or a mixture thereof or the source of the at least one further sterol selected form the group consisting of cholesterol, 24-Methylenecholesterol, campesterol, and beta-sitosterol and stigmasterol is a pollen substitute tissue of one or more plant species selected from the group consisting of Solanaceae, Poaceae, Ranunculaceae, Fabaceae and Corylaceae.

17. The method of claim 1, wherein the source of the isofucosterol, fucosterol or a mixture thereof or the source of the at least one further sterol selected from the group consisting of cholesterol, 24-Methylenecholesterol, campesterol, and beta-sitosterol and stigmasterol is a pollen substitute source selected from the group consisting of:
   a marine or freshwater algal species, in particular an extract, an oil or a refinement of *Ulva lactuca;*
   a marine dialom species, in particular an extract, an oil or a refinement of *Thalassiosira pseudonana, Thalassiosira rotule,* or *Chaetoceros muelleri*; and
   a fungus, in particular an extract, an oil or a refinement of yeast such as *Saccharomyces cerevisae* or *Yarrowia lipolytica.*

18. The method of claim 1, wherein the isofucosterol or fucosterol and the at least one further sterol selected from the group consisting of cholesterol, 24-Methylenecholesterol, campesterol, beta-sitosterol and stigmasterol is chemically or enzymatically synthesized or obtained by genetically modified host organisms such as fungi, bacteria, or algae.

19. The method of claim 1, wherein the source of the isofucosterol or fucosterol or the at least one further sterol selected from the group consisting of cholesterol, 24-Methylenecholesterol, campesterol, beta-sitosterol and stigmasterol is selected from the group consisting of algae, plant, fungus, diatom and combinations thereof and wherein the source of the isofucosterol, fucosterol or a mixture thereof is a pollen substitute tissue.

20. The method of claim 1, wherein the isofucosterol or fucosterol or a mixture thereof, and the at least one further sterol selected from the group consisting of cholesterol, 24-Methylenecholesterol, campesterol, beta-sitosterol and stigmasterol is provided to a eusocial bee colony from a synthetic source.

21. The method of claim 1, wherein the pollen substitute composition is essentially free of pollen.

22. The method of claim 1, wherein the pollen substitute composition is administered as a concentrated patty, wherein the concentration of isofucosterol, fucosterol, cholesterol, 24-Methylenecholesterol, campesterol, beta-sitosterol and stigmasterol is from 10 w % to 33 w % as compared to the total weight of the pollen substitute composition.

23. The method of claim 1, wherein the composition comprises a bee consumption/appetite inducing constituent selected from the group consisting of pollen, sugar, oil, fat, honey, protein and a mixture thereof.

24. The method of claim 23, wherein the concentration of the bee appetite/consumption inducing constituent is selected from (x), (y) and (z) wherein (x), (y) and (z) are:
   (x) from 1 w % to 20 w %,
   (y) from 2.5 w % to 15 w %,
   (z) from 5 w % to 10 w %
each as compared to the total weight of the pollen substitute composition.

25. The method of claim 1, wherein the pollen substitute composition is in liquid form or in powder.

26. The method of claim 1, wherein the concentration of amount of isofucosterol, fucosterol, cholesterol, 24-Methylenecholesterol, campesterol, beta-sitosterol and stigmasterol or a mixture thereof is from 0.01 w % to 99 w % as compared to the total dry weight of the pollen substitute composition.

27. The method of claim 1,
   wherein the invertebrates are selected from (c), (d) or (e) wherein (c), (d) and (e) are:
   (c) pollen eating insects,
   (d) insects of the order Hymenoptera and Coleoptera,
   (e) honey bees, bumble bees, black soldier flies, hover-flies, or ladybirds,
   and where the aquacultural organisms are selected from (f), and (g) and, wherein (f) and (g) are:
   (f) plankton and algae eating aquacultural organisms,
   (g) fish, fish larvae, oysters, clams, molluscs, gastropods, or crustacea.

28. The method of claim 1, wherein the total concentration of sterols is selected from (c), (d), (e) or (f) and wherein (c), (d), (e) and (f) are:
   (c) from 0.01 w % to 4 w %,
   (d) from 0.05 w % to 3 w %
   (e) from 0.05 w % to 2 w %,
   (f) from 0.05 w % to 1.5 w %
each as compared to the total weight of the pollen substitute composition.

29. The method of claim 1, wherein the concentrations of sterols are chosen from the group of:
   cholesterol, which if present, is in an amount selected from (c), (d) and (e), wherein (c), (d) and (e) are:
   (c) from 0.001 w % to 2 w %,
   (d) from 0.001 w % to 1.5 w %,
   (e) from 0.06 w % to 1.2 w %
   each as compared to the total weight of the pollen substitute composition,
   24-Methylenecholesterol, which, if present, is in an amount selected from (c), (d) or (e) above
   each as compared to the total weight of the pollen substitute composition,
   sitosterol or beta-sitosterol which, if present, is in an amount selected from (c), (d) or (e) above,
   each as compared to the total weight of the pollen substitute composition,
   isofucosterol, which, if present, is in an amount selected from (f), (g), (h), or (i), wherein (f), (g), (h) and (i) are
   (f) from 0.01 w % to 5 w %,
   (g) from 0.01 w % to 2 w %,
   (h) from 0.01 w % to 1.0 w %,
   (i) from 0.03 w % to 0.6 w %,
   each as compared to the total weight of the pollen substitute composition,
   stigmasterol, which, if present, is in an amount selected from (j), (k) or (l) wherein (j), (k) and (l) are:

j) from 0 w % to 2 w %, (k) from 0.001 w % to 1 w %, (l) from 0.01 w % to 0.2 w %, each as compared to the total weight of the pollen substitute composition, or any combination thereof.

30. The method of claim 1, wherein the isofucosterol, fucosterol or a mixture thereof and the one or more further sterols selected from the group consisting of cholesterol, 24-Methylenecholesterol, campesterol, and beta-sitosterol and stigmasterol are provided as part of a pollen substitute composition, wherein the pollen substitute composition comprises (i), (ii), (iii), (iv), (v), (vi) and may comprise (vii) and may comprise (viii), wherein (i) proteins in an amount from 10 w % to 50 w %, (ii) proteins in an amount from 20 w % to 40 w %;

(iii) fatty acids in an amount from 1 w % to 20 w %, (iv) fatty acids in an amount from 4 w % to 12 w %;

(v) carbohydrates in an amount from 30 w % to 90 w %, (vi) carbohydrates in an amount from 5 w % to 15 w %;

(vii) vitamins;

(viii) minerals, and wherein the total amount adds up to 100 w % and wherein the w % are related to the total dry weight of the composition.

31. A pollen-free feed composition or a pollen-substitute composition in particular for bees comprising either from 0.01 w % to 1 w % isofucosterol, or from 0.01 w % to 0.3 w % isofucosterol, each as compared to the total weight of the pollen-substitute composition, wherein the composition optionally further comprises natural pollen in an amount from 1 w % to 15 w % as compared to the total weight of the pollen-substitute composition to increase food consumption; or from 0.01 w % to 1 w % fucosterol, or from 0.01 w % to 0.3 w % fucosterol, each as compared to the total weight of the pollen-substitute composition, wherein the composition optionally further comprises natural pollen in an amount from 1 w % to 15 w % as compared to the total weight of the pollen-substitute composition to increase food consumption; or from 0.01 w % to 1 w % isofucosterol and fucosterol, or from 0.01 w % to 0.3 w % isofucosterol and fucosterol, each as compared to the total weight of the pollen-substitute composition, wherein the weight-ratio of isofucosterol to fucosterol is from 0.01: to 100 to 100:0.01 and wherein the composition optionally further comprises natural pollen in an amount from 1 w % to 15 w % as compared to the total weight of the pollen-substitute composition to increase food consumption; or from 0.01 w % to 1 w % isofucosterol/fucosterol, or from 0.01 w % to 0.3 w % isofucosterol/fucosterol, each as compared to the total weight of the pollen-substitute composition, wherein the weight-ratio of isofucosterol to fucosterol is from 0.01:100 to 100:0.01;

wherein the pollen substitute composition further comprises from 0.01 w % to 0.5 w % 24-methylene-cholesterol as compared to the total weight of the pollen-substitute composition;

wherein the ratio of isofucosterol and fucosterol to 24-methylene-cholesterol is from 2:100 to 100:2; and wherein the pollen substitute composition optionally further comprises natural pollen in an amount from 1 w % to 15 w % each as compared to the total weight of the pollen-substitute composition to increase food consumption; or from 0.01 w % to 1 w % 24-methylene-cholesterol, or from 0.01 w % to 0.3 w % 24-methylene-cholesterol, each as compared to the total weight of the pollen-substitute composition;

wherein the pollen substitute composition further comprises isofucosterol and fucosterol with a weight-ratio of isofucosterol to fucosterol from 0.01:100 to 100:0.01;

wherein the weight ratio of isofucosterol and fucosterol to 24-methylene-cholesterol is from 2:100 to 100:2; and wherein the pollen substitute composition optionally further comprises natural pollen in an amount from 1 w % to 15 w % each as compared to the total weight of the pollen-substitute composition to increase food consumption.

32. A pollen-free feed composition or a pollen-substitute composition in particular for bees comprising 0.02 w % to 3 w % sterols, wherein the sterols are selected from the group consisting of 24-methylene-cholesterol, isofucosterol, fucosterol, beta-sitosterol, campesterol, stigmasterol, ergosterol and cholesterol as compared to the total weight of the pollen-substitute composition;

wherein the weight-ratio of isofucosterol and fucosterol to 24-methylene-cholesterol is from 0.5:100 to 100:0.5; and/or wherein the weight-ratio of isofucosterol to fucosterol is from 0:10 to 10:0 and/or wherein the weight-ratio of isofucosterol to the sum of one or more other sterols selected from the group consisting of 24-methylene-cholesterol, fucosterol, beta-sitosterol, campesterol, stigmasterol, cholesterol, and ergosterol is from 2:100 to 100:2 and/or wherein the weight-ratio of fucosterol to the sum of other one or more other sterols selected from the group consisting of 24-methylene-cholesterol, isofucosterol, beta-sitosterol, campesterol, stigmasterol, cholesterol, and ergosterol is from 2:100 to 100:2 and/or wherein the weight-ratio of 24-methylene-cholesterol to the sum of one or more other sterols selected from the group consisting of isofucosterol, beta-sitosterol, campesterol, stigmasterol, cholesterol, and ergosterol is from 2:100 to 100:2 and/or wherein the weight-ratio of cholesterol to the sum of one or more other sterols selected from the group consisting of 24-methylene-cholesterol, isofucosterol, fucosterol, beta-sitosterol, campesterol, stigmasterol, and ergosterol is from 15:1 to 100; and/or wherein the pollen substitute composition optionally further comprises natural pollen in an amount from 1 w % to 15 w % each as compared to the total weight of the pollen-substitute composition to increase food consumption.

* * * * *